United States Patent
Elliott

(10) Patent No.: US 11,126,771 B2
(45) Date of Patent: *Sep. 21, 2021

(54) VERIFICATION OF HARDWARE DESIGN FOR DATA TRANSFORMATION PIPELINE

(71) Applicant: Imagination Technologies Limited, Kings Langley (GB)

(72) Inventor: Sam Elliott, London (GB)

(73) Assignee: Imagination Technologies Limited, Kings Langley (GB)

(*) Notice: Subject to any disclaimer, the term of this patent is extended or adjusted under 35 U.S.C. 154(b) by 90 days.

This patent is subject to a terminal disclaimer.

(21) Appl. No.: 16/372,138

(22) Filed: Apr. 1, 2019

(65) Prior Publication Data
US 2019/0311074 A1 Oct. 10, 2019

(30) Foreign Application Priority Data

Apr. 5, 2018 (GB) ........................... 1805722
Apr. 5, 2018 (GB) ........................... 1805723

(Continued)

(51) Int. Cl.
| | |
|---|---|
| *G06F 30/3323* | (2020.01) |
| *G06F 30/367* | (2020.01) |
| *G06F 30/398* | (2020.01) |
| *G06F 30/3308* | (2020.01) |
| *G06F 30/323* | (2020.01) |
| *G01R 31/3183* | (2006.01) |

(52) U.S. Cl.
CPC . *G06F 30/3323* (2020.01); *G01R 31/318357* (2013.01); *G06F 30/323* (2020.01);
(Continued)

(58) Field of Classification Search
CPC .. G06F 30/3323; G06F 30/367; G06F 30/398; G06F 30/3308; G06F 30/323; G01R 31/318357

(Continued)

(56) References Cited

U.S. PATENT DOCUMENTS

| | | |
|---|---|---|
| 6,526,544 B1 | 2/2003 | Peled et al. |
| 9,009,468 B1 * | 4/2015 | Zayed ................. H04L 63/0272 713/164 |

(Continued)

FOREIGN PATENT DOCUMENTS

WO      2010053603 A1    5/2010

OTHER PUBLICATIONS

Rashinkar et al., "System-on-chip Verification: Methodology and Techniques", Kluwer Academic Publishers, 2002, 393 pages. (Year : 2002).*

(Continued)

*Primary Examiner* — Phallaka Kik
(74) *Attorney, Agent, or Firm* — Potomac Law Group, PLLC; Vincent M DeLuca

(57) ABSTRACT

Methods and systems for verifying, via formal verification, a hardware design for a data transformation pipeline comprising one or more data transformation elements that perform a data transformation on one or more inputs, wherein the formal verification is performed under conditions that simplify the data transformations calculations that the formal verification tool has to perform. In one embodiment the hardware design for the data transformation pipeline is verified by replacing one or more of the data transformation elements in the hardware design with a function element which is treated as an unevaluated function of its combinational inputs by a formal verification tool such that during formal verification the function element will produce the same output for the same inputs, and formally verifying that for each transaction of a set of transactions an instantiation of the modified hardware design for the data transformation pipeline produces a set of one or more outputs that matches a reference set of one or more outputs for that transaction.

20 Claims, 16 Drawing Sheets

(30) Foreign Application Priority Data

Nov. 6, 2018 (GB) .................................... 1818105
Nov. 6, 2018 (GB) .................................... 1818108

(52) U.S. Cl.
CPC ........ *G06F 30/3308* (2020.01); *G06F 30/367* (2020.01); *G06F 30/398* (2020.01)

(58) Field of Classification Search
USPC ............. 716/106, 103, 107, 136; 703/16, 17
See application file for complete search history.

(56) References Cited

U.S. PATENT DOCUMENTS

| 10,719,646 | B2* | 7/2020 | Elliott | G01R 31/318357 |
| 10,984,162 | B2* | 4/2021 | Elliott | G06F 30/3323 |
| 2007/0143717 | A1 | 6/2007 | Koelbl et al. | |
| 2010/0199241 | A1 | 8/2010 | Baumgartner et al. | |
| 2015/0278057 | A1* | 10/2015 | He | G06F 11/2635 714/33 |
| 2015/0278060 | A1* | 10/2015 | He | G06F 11/273 714/37 |
| 2016/0321386 | A1* | 11/2016 | Darbari | G06F 30/3312 |
| 2020/0302104 | A1* | 9/2020 | Elliott | G01R 31/318357 |

OTHER PUBLICATIONS

Velev, "Integrating Formal Verification into an Advanced Computer Architecture Course," IEEE Transaction on Education, vol. 48, No. 2, pp. 216-222, May 2005.

Vittal, "Using sequential equivalence to verify clock-gating strategies," Nov. 6, 2017, www.techdesignforums.com/practice/technique/using-sequential-equivalence-to-verify-clock-gating-strategies/, 6 pages.

* cited by examiner

VERIFICATION OF HARDWARE DESIGN FOR DATA TRANSFORMATION PIPELINE

BACKGROUND

Many electronic devices, such as systems-on-chips (SoCs), include hardware that implements a data transformation pipeline. As is known to those of skill in the art, a pipeline comprises a set of processing elements wherein the output of a processing element in the set is the input to a processing element in the set. A data transformation pipeline is a type of pipeline that is configured to perform a data transformation on a set of one or more inputs. The term "data transformation" is used herein to mean any operation (e.g. mathematical operations such as, but not limited to, arithmetic operations including addition, subtraction, multiplication, division etc.) that can be performed on, or applied to, a set of data to produce new data. Accordingly, a data transformation pipeline receives a set of one or more inputs and outputs the result of a data transformation performed on the set of inputs. A data transformation pipeline comprises at least one data transformation element configured to perform a data transformation on a set of inputs, but it may also include other types of processing elements. When a pipeline generates an output for a set of inputs the pipeline is said to execute a 'transaction'. Accordingly, a pipeline is said to execute the same transaction if it generates an output for the same set of inputs.

A data transformation pipeline may be a linear or non-linear pipeline and it may have a single processing element or multiple processing elements. FIGS. 1-3 illustrate example data transformation pipelines configured to perform an arithmetic calculation on a set of inputs. FIG. 1 illustrates a first example data transformation pipeline 100 configured to calculate the sum of eight inputs ($a_0+a_1+a_2+a_3+a_4+a_5+a_6+a_7$). The data transformation pipeline 100 of FIG. 1 comprises a single data transformation element 102, a register 104 and control logic 106. The data transformation element 102 receives an input $a_i$ in each of eight cycles (numbered 0 to 7) and adds the input to the sum of the previous inputs $b_i$ (i.e. the value of the register 104 in the previous cycle) and stores the new sum in the register 104. The control logic 106 is configured to provide the value of the register 104 to the data transformation element 102 in each cycle, and output the value of the register 104 after the eighth cycle (i.e. after the sum $a_0+a_1+a_2+a_3+a_4+a_5+a_6+a_7$ has been generated). The control logic 106 is also configured to set the value of the register 104 to 0 on reset and after the value of the register 104 is output. Where the data transformation element 102 is configured to generate the sum of the two inputs ($a_i$ and $b_i$) in a single cycle the output of the pipeline may be expected to be output after eight cycles. However, there may be random external events, such as stalls or interrupts, which affect the movement of data through the pipeline by one or more clock cycles.

FIG. 2 illustrates a second example data transformation pipeline 200 configured to calculate (a+b)*c. The data transformation pipeline 200 comprises two data transformation elements 202, 204, a register 206, and control logic 208. The first data transformation element 202 is configured to calculate the sum of the inputs a and b and store the sum y in the register 206. The second data transformation element 204 is configured to calculate the product of the register 206 value (i.e. the output of the first data transformation element 202 y) and the input c. The control logic 208 controls the operation of the register 206 to ensure that the value of the register 206 is provided to the second data transformation element 204 at the correct time.

FIG. 3 illustrates a third example data transformation pipeline 300 configured to calculate (a+b). The data transformation pipeline 300 comprises two processing elements 302, 304, a register 306 and control logic 308. The first processing element 302 is a data transformation element configured to calculate the sum of the inputs a and b. The second processing element 304 is not a data transformation element as it does not transform the data input thereto, it simply stores the value of the register 306 (i.e. the output of the data transformation element 302) y until the result is requested by a downstream component. The control logic 308 controls the operation of the register 306 to ensure that the value of the register 306 is provided to the second processing element 304 at the correct time.

Generating hardware that implements a data transformation pipeline typically includes developing a hardware design that describes the structure and/or function of an integrated circuit that implements the data transformation pipeline; verifying or testing the hardware design to ensure that an integrated circuit manufactured according to the design will behave as expected; and once verified, manufacturing an integrated circuit, at an integrated circuit manufacturing system, in accordance with the hardware design.

In some cases, verifying the hardware design for a data transformation pipeline may comprise verifying that an instantiation of the hardware design produces the correct result to the data transformation regardless of when the transformation is performed. Specifically, since a data transformation pipeline may perform a transformation at any time after reset (e.g. immediately after reset, or, for example, 10,000 cycles after reset) and with a variable amount of latency (e.g. due to stalls or interrupts) it is important to verify that regardless of when the transformation is performed that an instantiation of the hardware design will produce the correct result to the transformation.

In other cases, verifying the hardware design for a data transformation pipeline may comprise verifying that an instantiation of the hardware design always (regardless of when the transformation is performed) produces the same result as an instantiation of another similar hardware design. This type of verification may be referred to as verifying that the hardware designs are functionally equivalent. This type of verification may be used when an original hardware design is modified to verify that the modified hardware design will produce the same results as the original hardware design.

A hardware design may be verified, for example, by formal verification or simulation-based verification. Formal verification is a systematic process that uses a mathematical model of the hardware design and mathematical reasoning to verify the hardware design. In contrast, simulation-based verification is a process in which a hardware design is tested by applying stimuli to an instantiation of the hardware design and monitoring the output of the instantiation of the hardware design in response to the stimuli.

In formal verification, the hardware design is transformed into a mathematical model (e.g. a state-transition system, or a flow graph) to thereby provide an instantiation of the hardware design which can be tested to verify the hardware design, and formal properties to be verified are expressed using mathematical logic using a precise syntax or a language with a precise mathematical syntax and semantics.

Formal verification is performed using a formal verification tool (i.e. a software tool that is capable of performing formal verification of a hardware design). Formal verification tools include, but are not limited to, formal equivalence checkers such as OneSpin 360 DV™, Mentor Graphics Questa® Formal Verification, Synopsys® VC Formal, Cadence® Incisive® Enterprise Verifier, and JasperGold®; and formal property checkers (which may also be referred to as formal model checkers) such as Synopsys® HECTOR, and other logical equivalence checkers (LECs) and sequential logical equivalence checkers (SLECs)). Some formal verification tools, which may be referred to herein as arithmetic formal verification tools, are proficient at verifying properties related to data transformations (such as arithmetic operations) but can typically only be used to prove a property over a finite period of time. Other verification tools, which may be referred to herein as infinite time formal verification tools are proficient at verifying a property over an infinite time period but are poor at verifying properties related to data transformations (such as arithmetic operations).

Since existing formal verification tools are proficient at verifying properties related to data transformations, or proficient at verifying a property over infinite time, not both, it is difficult, if not impossible, using an existing formal verification tool to verify the output of an instantiation of a hardware design for a data transformation over infinite time. Accordingly it is difficult, using an existing formal verification tool to verify that an instantiation of a hardware design for a data transformation pipeline will always transform the data correctly, or will always transform the data in the same manner as an instantiation of another hardware design, regardless of when the transformation is performed.

The embodiments described below are provided by way of example only and are not limiting of implementations which solve any or all of the disadvantages of known methods and systems for verifying a hardware design for a data transformation pipeline.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for verifying, via formal verification, a hardware design for a data transformation pipeline comprising one or more data transformation elements that perform a data transformation on one or more inputs, wherein the formal verification is performed under one or more conditions that simplify the data transformation calculations that the formal verification tool has to perform. In one embodiment the hardware design for the data transformation pipeline is verified by formally verifying that the output of an instantiation of the hardware design produces the same output as an instantiation of a hardware design for another data transformation pipeline for a predetermined set of transactions under a constraint that substantially equivalent data transformation elements between the data transformation pipelines produce the same output(s) in response to the same input(s). In another embodiment the hardware design for the data transformation pipeline is verified by replacing one or more of the data transformation elements in the hardware design with a function element which is treated as an unevaluated function of its combinational inputs by a formal verification tool such that during formal verification the function element will produce the same output for the same inputs, and formally verifying that for each transaction of a set of transactions an instantiation of the modified hardware design for the data transformation pipeline produces a set of one or more outputs that matches a reference set of one or more outputs for that transaction.

A first aspect provides a computer-implemented method of verifying a hardware design for a data transformation pipeline, the data transformation pipeline comprising one or more data transformation elements that perform a data transformation on one or more inputs, the method comprising at one or more processors: generating a version of the hardware design for the data transformation pipeline in which a data transformation element of the one or more data transformation elements has been replaced with, or linked to, a function element, the function element being treated as an unevaluated function of its inputs by a formal verification tool such that during formal verification the function element produces a same set of one or more outputs in response to a same set of one or more inputs; and formally verifying that for each transaction of a set of transactions an instantiation of the version of the hardware design for the data transformation pipeline produces a set of one or more outputs that matches a reference set of one or more outputs for that transaction.

A second aspect provides a system for verifying a hardware design for a data transformation pipeline, the data transformation pipeline comprising one or more data transformation elements that perform a data transformation on one or more inputs, the system comprising: memory configured to store: a version of the hardware design for the data transformation pipeline in which a transformation element of the one or more data transformation elements has been replaced with a function element, the function element being treated as an unevaluated function of its inputs by a formal verification tool such that during formal verification the function element produces a same set of one or more outputs in response to a same set of one or more inputs; and a formal verification tool; and one or more processors configured to: formally verify, using the formal verification tool, that for each transaction of a set of transactions an instantiation of the version of the hardware design for the data transformation pipeline produces a set of one or more outputs that matches a reference set of one or more outputs for that transaction.

A hardware design for a data transformation pipeline, when processed in an integrated circuit manufacturing system, configures the system to manufacture the data transformation pipeline. There may be provided a non-transitory computer readable storage medium having stored thereon a hardware design for a data transformation pipeline that, when processed in an integrated circuit manufacturing system, causes the integrated circuit manufacturing system to manufacture an integrated circuit embodying the data transformation pipeline.

There may be provided an integrated circuit manufacturing system comprising: a non-transitory computer readable storage medium having stored thereon a hardware design for a data transformation pipeline; a layout processing system configured to process the computer readable description so as to generate a circuit layout description of an integrated circuit embodying the data transformation pipeline; and an integrated circuit generation system configured to manufacture an integrated circuit embodying the data transformation pipeline according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
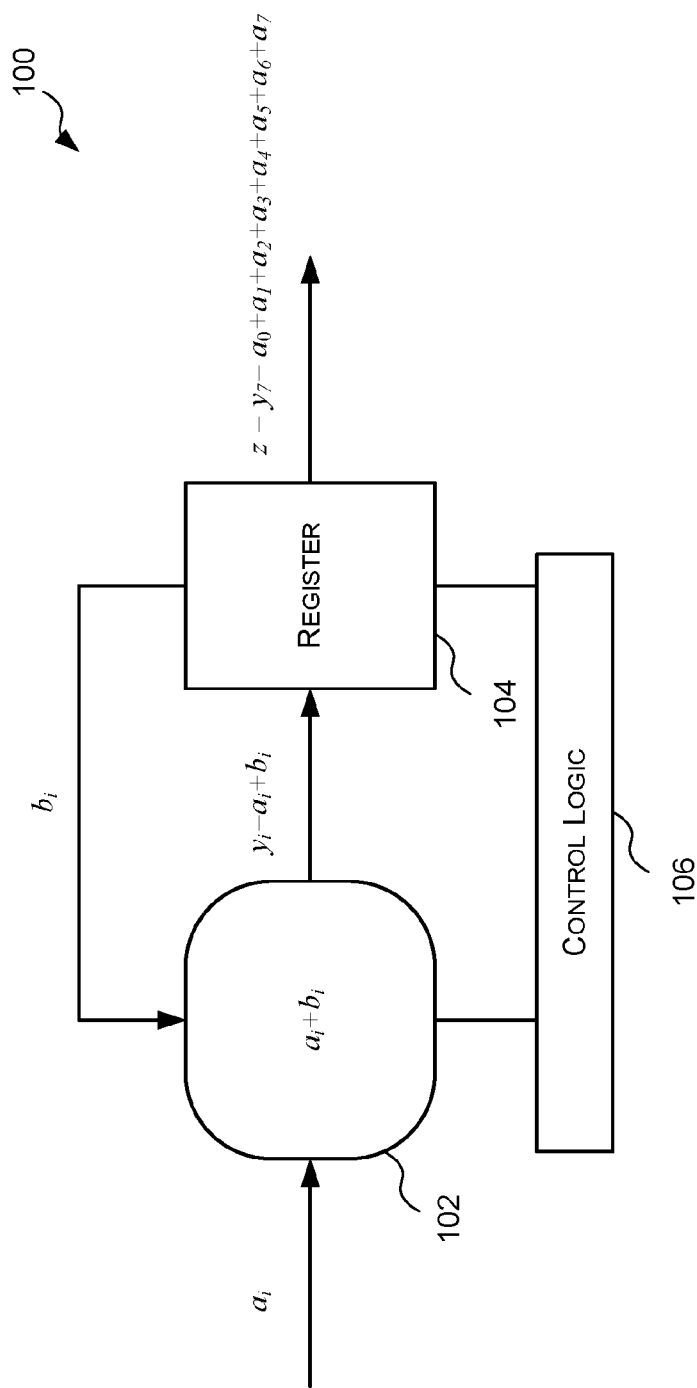
FIG. 1 is a block diagram of a first example data transformation pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A "hardware design" is a description of the structure and/or function of an integrated circuit which when processed at an integrated circuit manufacturing system causes the integrated circuit manufacturing system to generate an integrated circuit described by the hardware design. For example, as described in more detail below with respect to FIG. 16, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used such as proprietary high-level hardware description languages.

An "instantiation of a hardware design" is a representation of the hardware and/or functionality of the hardware defined by the hardware design. An instantiation of a hardware design includes, but is not limited to, an emulation model of the hardware design that simulates the behaviour of the hardware defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

A hardware design for a data transformation pipeline is thus a description of the structure and/or function of an integrated circuit to implement a data transformation pipeline which, when processed at an integrated circuit manufacturing system causes the integrated circuit manufacturing system to generate an integrated circuit that implements a data transformation pipeline. As described above, a data transformation pipeline comprises at least one data transformation element which is configured to perform a data transformation on a set of one or more inputs. Accordingly, a hardware design for a data transformation pipeline includes a description of the structure and/or function of each data transformation element of the pipeline.

As described above, because existing formal verification tools are generally proficient at verifying properties related to data transformations (such as arithmetic operations), or proficient at verifying a property over infinite time, but not both, it is difficult, to verify, using an existing formal verification tool, the output of an instantiation of a hardware design for a data transformation pipeline over infinite time—e.g. that an instantiation of a hardware design for a data transformation pipeline will always produce the correct result to a transaction, regardless of when the transformation is performed after reset; or that an instantiation of a hardware design for a data transformation pipeline will always produce the same result as an instantiation of a hardware design for another data transformation pipeline.

For example, a formal verification tool that is proficient at verifying data transformations (i.e. an arithmetic formal verification tool) may be able to formally verify that an instantiation of a data transformation pipeline will produce the correct result to a data transformation performed on a set of inputs (i.e. a transaction executed) from a predetermined state of the pipeline (e.g. the state that arises after reset) under one or more predetermined conditions (e.g. no stalls or interrupts). This may be accomplished for example, by formally verifying, via an arithmetic formal verification tool, that the result of a transformation performed by an instantiation of the hardware design on a set of inputs from the predetermined state (e.g. the state that occurs after reset) under the one or more conditions matches the result of a test bench component that is configured to simulate the behaviour of the data transformation pipeline. Since the formal verification tool verifies that the outputs match for all possible sets of inputs, this verifies that the instantiation of the hardware design will produce the correct result for any set of inputs. However, this only verifies that an instantiation of the hardware design will produce the correct result when the transformation is performed from the predetermined state (e.g. the state arising from reset). It doesn't verify that an instantiation of the hardware design will produce the correct result if a transformation is performed on a set of inputs from another state of the pipeline (e.g. the state arising after a first transaction and a stall or the state arising after two transactions and two stalls).

To verify that an instantiation of the hardware design will produce the correct result for a transformation performed on a set of inputs (i.e. a transaction executed) from another state (e.g. a state that occurs a period of time after reset), the formal verification tool may be configured to verify the result of a transformation performed by an instantiation of the hardware design on a set of inputs from another predetermined state (e.g. the state that arises after reset, a first transaction and a stall). While verifying the result of a transformation performed from multiple states of the pipeline increases the chances of catching obscure errors or bugs, this still only verifies that an instantiation of the hardware design will produce the correct result to transformations performed (i.e. transactions executed) from the predetermined states (e.g. the state arising from reset, and the state arising after a first transformation is performed on a set of inputs and a stall) explicitly tested, not from any other state of the pipeline.

The inventor has identified, however, that if it has been verified, via for example, an arithmetic formal verification tool, that an instantiation of the hardware design will produce the correct result to a transformation performed on any set of inputs from a predetermined state (e.g. the state arising from reset) under a predetermined set of conditions (e.g. no stalls or interrupts once the calculation begins) that verifying that an instantiation of the hardware design will always produce the correct result to a transformation performed on any set of inputs, regardless of when the transformation is performed, can be done by verifying that the result of a transformation performed by the instantiation of the hardware design for a set of inputs from the predetermined state (e.g. the state arising from reset) matches the result of the same transformation (i.e. same inputs) performed by the instantiation of the hardware design from any other state.

However, this cannot simply be done by verifying, using a formal verification tool that is proficient at proving a property over infinite time (i.e. an infinite time formal verification tool), that the result of a transformation performed by an instantiation of the hardware design for a set of inputs from a predetermined state matches the result of a transformation performed by an instantiation of the hardware design for the same set of inputs from any other state of the pipeline. This is because formal verification tools that are proficient at verifying a property over infinite time are not generally able to efficiently verify the result of data transformations and thus are not able to verify the output of the data transformation elements.

Since it can be verified, using an arithmetic formal verification tool, that the pipeline will produce the correct result to a transformation performed on any set of inputs from a predetermined state, what is left to verify is that regardless of when a transformation is performed on a set of inputs the pipeline will produce the same results. In other words, what is left to verify is that the pipeline is consistent. To verify this, it is not imperative to verify that the result of a transformation performed by the instantiation of the hardware design from any other state of the pipeline is absolutely correct, only that the pipeline will produce the same output given the same inputs. In other words, what is left to verify is that when the pipeline is presented with the same inputs, regardless of the state of the pipeline, the data will move through the pipeline in the same manner—i.e. that the control logic of the pipeline works as expected. Accordingly, what is left to verify is that when a pipeline executes the same transaction (i.e. processes the same inputs) it will produce the same output.

Accordingly, described herein are methods and systems for verifying, via formal verification, a hardware design for a data transformation pipeline comprising one or more data transformation elements that perform a data transformation on one or more inputs, wherein the formal verification is performed under one or more conditions or restrictions that simplify the data transformation calculations that the formal verification tool has to perform which increases the likelihood that the formal verification converges. The one or more conditions or restrictions are configured to restrict the control of the data transformation pipeline, but not the inputs to the data transformation pipeline.

A first embodiment for verifying a hardware design for a first data transformation pipeline is described with respect to FIGS. 4 to 11. In this embodiment the method comprises formally verifying that the output(s) of an instantiation of the hardware design for the first data transformation pipeline match the output(s) of an instantiation of a hardware design for a second data transformation pipeline for a predetermined set of transactions. The second data transformation pipeline also comprises one or more data transformation elements that perform a data transformation on one or more inputs. At least one of the data transformation elements of the second data transformation pipeline is substantially equivalent to a data transformation element of the first data transformation pipeline. The formal verification is performed under a constraint that the substantially equivalent data transformation elements of the first and second data transformation pipelines produce the same outputs in response to the same inputs.

Where the second data transformation pipeline is different than the first data transformation pipeline then the method can be used to verify that the hardware designs for the first and second data transformations are functionally equivalent. In contrast, where the second data transformation pipeline is the same as the first data transformation pipeline then the method can be used to verify that the hardware design is consistent (i.e. that an instantiation of the hardware design will generate the same output in response to the same input(s) regardless of when the input(s) are processed). It is noted that this does not verify that an instantiation of the hardware design will always produce the correct result, only that an instantiation of the hardware design will produce the same result. However, this verification in combination with a verification that an instantiation of the hardware design produces the correct result for a data transformation performed on any set of inputs from a particular state of the pipeline (which, as described above, can be performed using an arithmetic formal verification tool) exhaustively verifies that an instantiation of the hardware design will always produce the correct result to a transformation.

A second embodiment for verifying a hardware design for a data transformation pipeline is described below with respect to FIGS. 12 to 13. In this embodiment, the method comprises: generating a version of the hardware design for the data transformation pipeline in which a selected set of data transformation elements are replaced with, or linked to, a function element which is treated as an unevaluated function of its inputs by a formal verification tool such that during formal verification the function element will produce the same output for the same inputs; and formally verifying that an instantiation of the version of the hardware design for the data transformation pipeline produces, for any transaction, a set of one or more outputs that matches a reference set of one or more outputs for that transaction.

In some cases, verifying that an instantiation of the version of the hardware design for the data transformation pipeline produces, for any transaction, a set of one or more outputs that matches a reference set of one or more outputs for that transaction may comprise formally verifying that an instantiation of the version of the hardware design is consistent (i.e. that it will always produce the same result to a transaction regardless of when the transaction is executed). In other cases, verifying that an instantiation of the version of the hardware data for the data transformation pipeline produces, for any transaction, a set of one or more outputs that match a reference set of one or more outputs for that transaction may comprise formally verifying that an instantiation of the version of the hardware design is functionally equivalent to an instantiation of a hardware design for another data transformation pipeline.

Figure 4:
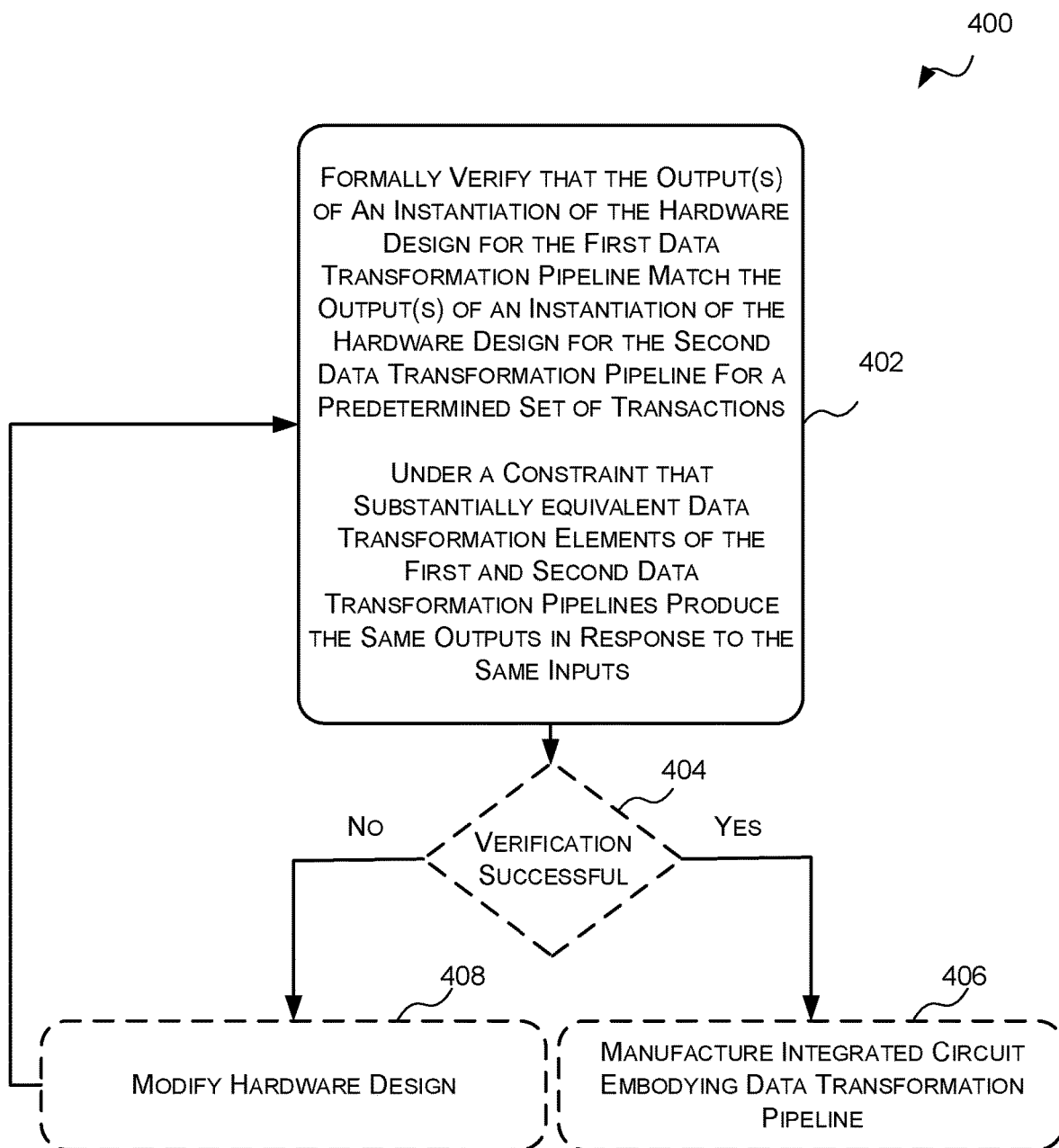
FIG. 4 is a flow diagram of a first example method for verifying a hardware design for a data transformation pipeline.

Reference is now made to FIG. 4 which illustrates a first example method 400 for verifying a hardware design for a first data transformation pipeline. The method 400 may be implemented by a computing-based device such as, but not limited to, the computing-based device 1400 described below with respect to FIG. 14. For example, there may be computer readable storage medium having stored thereon computer readable instructions that, when executed at a computing-based device, cause the computing-based device to perform the method 400 of FIG. 4.

The method 400 begins at block 402 where it is formally verified that the output(s) of an instantiation of the hardware design for the first data transformation pipeline matches the output(s) of an instantiation of a hardware design for a second data transformation pipeline (i.e. that the hardware designs for the two data transformation pipelines are functionally equivalent) for a predetermined set of transactions. As described above, a data transformation pipeline comprises at least one data transformation element configured to perform a data transformation on a set of one or more inputs, but it may also include other types of processing elements. Accordingly, each of the first and second data transformation pipelines comprises at least one data transformation element that performs a data transformation (e.g. an arithmetic operation) on one or more inputs.

At least one of the data transformation elements of the second data transformation pipeline is substantially equivalent, or functionally equivalent, to at least one data transformation element of the first data transformation pipeline. Two data transformation elements are said to be substantially equivalent if they will produce the same output(s) in response to the same input(s). For example, the first and second data transformation pipelines may each comprise a data transformation element that is configured to calculate the product of two inputs. The formal verification is performed under a constraint that the substantially equivalent data transformation element pairs of the first and second data transformation pipelines produce the same output(s) in response to the same input(s). For example, if data transformation element A in the first data transformation pipeline is substantially equivalent to data transformation element B in the second data transformation pipeline, the formal verification is performed under a constraint that data transformation element A and data transformation element B produce the same output(s) in response to the same input(s).

A data transformation element in one data transformation pipeline may be substantially equivalent to more than one data transformation element in the other data transformation pipeline. In these cases, the formal verification may be performed under a constraint or set of constraints that each pair of substantially equivalent data transformation elements produce the same output(s) in response to the same input(s). For example, if the first data transformation pipeline comprises data transformation elements A and B and the second data transformation pipeline comprises data transformation elements C and D. Data transformation element A may be substantially equivalent to data transformation elements C and D, and data transformation element B may also be substantially equivalent to data transformation elements C and D. In this example, the formal verification may be performed under the constraint that (i) data transformation elements A and C produce the same output(s) in response to the same input(s); (ii) data transformation elements A and D produce the same output(s) in response to the same input(s); (iii) data transformation elements B and C produce the same output(s) in response to the same input(s); and (iv) data transformation elements B and D produce the same output(s) in response to the same input(s).

In the examples described herein the substantially equivalent data transformation elements are presumed to be combinational (i.e. no stored data) but the methods and techniques described herein may also be applied in cases where the substantially equivalent data transformation elements are non-combinational so long as the state of the non-combinational elements is taken into account.

In some cases, the first and second data transformation pipelines may be different. In other words, in some cases the hardware designs for the first and second data transformation pipelines are different hardware designs. As described in more detail below with respect to FIG. 8, verifying the output(s) of instantiations of two different hardware designs can be used to verify that instantiations of the two hardware designs are functionally equivalent (i.e. that they will always produce the same output(s) in response to the same input(s)). In other cases, the first and second data transformation pipelines may be the same. In other words, in some cases, the hardware designs for the first and second data transformation pipelines may be two copies of the same hardware design. As described in more detail below with respect to FIG. 9, verifying the output(s) of instantiations of two copies of the same hardware design can be used to verify that an instantiation of the hardware design is consistent (i.e. that it will always produce the same output(s) in response to the same input(s) regardless of when the inputs are processed (i.e. regardless of the state of the pipeline when the input(s) are processed)).

Formally verifying that the output(s) of instantiations of the hardware designs for the first and second data transformation pipelines match for a predetermined set of transactions may comprise generating one or more assertions to be verified, linking the one or more assertions to the hardware designs for the first and second data transformation pipelines, and formally verifying, using a formal verification tool, that the one or more assertions are true (or hold) for the hardware design for the first data transformation pipeline, and outputting one or more signals indicating whether the one or more assertions were successfully verified.

An assertion is a statement that a particular property is expected to hold for a hardware design (i.e. is always true). An assertion of the form "assert property [evaluable expression]" is said to "assert" the property specified by the "evaluable expression". If an asserted property (e.g. the evaluable expression) is evaluated to be false for the hardware design for any valid input the hardware design is not behaving as expected and there is an error. For example, in the example assertion "assert property a=b"; if a is not equal to b at any point then the hardware design is not behaving as expected and there is an error.

Assertions are used to capture required temporal and combinational behaviour of the hardware design in a formal and unambiguous way. The hardware design can then be verified to determine that it conforms to the requirement as captured by the assertion(s). Since assertions capture the hardware design behaviour on a cycle-by-cycle basis they can be used to verify intermediate behaviours.

Assertions are typically expressed in an assertion language. An assertion language, which may also be referred to as a property language, captures the hardware design behaviour spread across multiple hardware design cycles (e.g. clock cycles) in a concise, unambiguous manner. While traditional hardware description languages (HDL), such as an RTL language, have the ability to capture individual cycle behaviour, they are too detailed to describe properties at a higher level. In particular, assertion languages provide means to express temporal relationships and complex hardware design behaviours in a concise manner. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

To verify that instantiations of the first and second hardware designs will produce the same output(s) for a predetermined set of transactions one or more assertions may be generated that, if proven to be true, establish that when any of the predetermined set of transactions is executed by an instantiation of the hardware design for the first data transformation pipeline that the output(s) thereof match the output(s) of the instantiation of the hardware design for the second data transformation pipeline when the same transaction is executed thereby. The one or more assertions may compare output(s) for transactions that are executed by the two instantiations from the same state. For example, as described below with respect to FIG. 8, when the method is used to verify that instantiations of two different hardware designs always produce the same output(s) the one or more assertions may be configured to compare the output(s) of the instantiations of the hardware designs when they execute the same transaction from the same state. In contrast, as described below with respect to FIG. 9, when the method is used to verify that an instantiation of a hardware design is consistent (i.e. that it will always produce the same output to a transaction regardless of when the transaction is executed) the one or more assertions may be configured to compare the output(s) of the instantiations of the hardware design when they execute the same transaction from different states. For example, the output(s) of the instantiation of the hardware design for the second data transformation pipeline when it executes transactions from a predetermined state of the pipeline may be compared to the output(s) of the instantiation of the hardware design for the first data transformation pipeline when it executes the same transaction from any other state of the pipeline. Example assertions which may be used in these cases are described below.

Once the one or more assertions have been generated the one or more assertions are linked to the hardware designs for the first and second data transformation pipelines. The one or more assertions may be linked to the hardware designs for the first and second data transformation pipelines by incorporating the one or more assertions into one of the hardware designs and binding or linking the hardware designs; or binding the one or more assertions to the hardware designs for the first and second data transformation pipelines. Specifically, the one or more assertions may be bound to the relevant signals of the hardware designs for the first and second data transformation pipelines to determine when the instantiations have executed one of the predetermined transactions, and to determine whether the outputs match when any of the predetermined transactions are executed.

Once the one or more assertions have been linked to the hardware designs for the first and second data transformation pipelines, the hardware designs for the first and second data transformation pipelines, the one or more assertions, and the bindings are loaded into a formal verification tool and the formal verification tool is configured to verify that the one or more assertions are true for the hardware design for the first data transformation pipeline.

An assertion is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability. Since formal verification of a property algorithmically and exhaustively explores all valid input values over time, verifying a property in this manner allows a property to be exhaustively proved or disproved for all valid states.

As described above, in the method 400 of FIG. 4 the formal verification is performed under one or more constraints that the substantially equivalent data transformation element pairs of the first and second data transformation pipelines produce the same output(s) in response to the same input(s). For example, if the first and second data transformation pipelines each comprise a data transformation element that is configured to compute the product of two inputs, these two data transformation elements may be considered to be substantially equivalent and the formal verification may be performed under a constraint that these two data transformation elements will produce the same output(s) in response to the same input(s). The inventor has identified that performing the formal verification under such constraint(s) significantly increases the likelihood that the formal verification will converge (i.e. produce a conclusive answer such as yes, the assertion(s) hold, or, no, at least one of the assertions does not hold). This is because the constraint acts as a hint which can simplify the calculations performed by the formal verification tool.

In some cases, the constraint may be implemented by one or more assumption statements. As is known to those of skill in the art, an assumption statement is interpreted by a formal verification tool as a constraint on the behaviour of an instantiation of a hardware design during formal verification. Specifically, when a property is assumed, formal verification tools constrain the inputs so that the property holds. Accordingly, assumptions define an environment in which a property of a hardware design is verified.

As is described in more detail below, when the method is used to verify that two hardware designs are functionally equivalent (i.e. that instantiations of the two hardware designs will always produce the same outputs in response to the same inputs) the assumption may state that whenever the substantially equivalent data transformation elements of the first and second data transformation pipelines receive the same inputs at the same time, or at related points in time, that their output(s) are the same. In contrast, when the method is used to verify that a hardware design is consistent (i.e. that an instantiation of the hardware design will produce the same output to any transaction regardless of when the transaction is executed) the assumption may state that if the substantially equivalent data transformation element of the second data transformation pipeline receives a set of inputs and produces a set of outputs as part of a transaction executed from a predetermined state that if the substantially equivalent data transformation element of the first data transformation pipeline receives the same set of inputs that it will produce the same set of outputs. In these cases, the substantially equivalent data transformation elements will be identical. Example assumptions which may be used in these cases are described below in relation to FIGS. 8 and 9.

When a formal verification tool is used to verify an assertion, the formal verification tool may output an indication of whether or not the assertion is valid (i.e. the asserted property is true for all valid states or sequences of states), which may also be referred to herein as the assertion being successfully verified. The output may be yes, the assertion is valid or has been successfully verified; no, the assertion is not valid (i.e. the asserted property it is not true or has failed for at least one valid state or sequence of states) or has not been successfully verified; or the formal verification was inconclusive. The formal verification may be inconclusive, for example, because the computing-based device running the formal verification tool has run out of memory or because the formal verification tool has determined that a certain amount of progress has not been made after a predefined period of time.

Where an assertion is not valid or has not been successfully verified, the formal verification tool may also output information indicating a state or sequence of states of the hardware design which causes the asserted property to fail. For example, the formal verification tool may output a trace of the verification indicating at what point, state or sequence of states the failure occurred.

Once the formal verification is complete the method 400 may end or the method may proceed to block 404.

At block 404, a determination may be made as to whether the verification of the first version of the hardware design for the data transformation pipeline was successful. As described above, when a formal verification tool is used to verify an assertion for a hardware design, the formal verification tool may output a signal or a set of signals that indicates whether or not the assertion is valid (i.e. the asserted property is true for all valid states or sequence of states). In these cases, the determination as to whether the verification was successful may be based on the output signal(s).

If it is determined that the verification was successful (indicating that the instantiation of the hardware design is working as expected) the method 400 may proceed to block 406 where an integrated circuit embodying the data transformation pipeline described by the hardware design is manufactured. If, however, it is determined that the verification of the hardware design for the first data transformation pipeline was not successful (indicating that there is an error in the hardware design) then the method 400 may proceed to block 408 where the hardware design for the first data transformation is modified to correct the error in the hardware design that caused the unexpected behaviour. Once the hardware design has been modified the modified hardware design may be re-verified (e.g. blocks 402-408 may be repeated for the modified hardware design).

In some cases, prior to performing the formal verification the substantially equivalent data transformation elements of at least one of the first and second data transformation pipelines may be replaced with simpler logic. Specifically, since the formal verification is verifying that the output(s) of the instantiations of the hardware designs for the first and second data transformation pipelines match, not that they are both 'correct' what is important is the control logic moving data through the pipeline is correct thus the substantially equivalent data transformation elements can be replaced with simpler logic. Specifically, the substantially equivalent data transformation elements of the first and/or second data transformation pipelines may be black boxed (i.e. replaced with a black box element).

Figure 5:
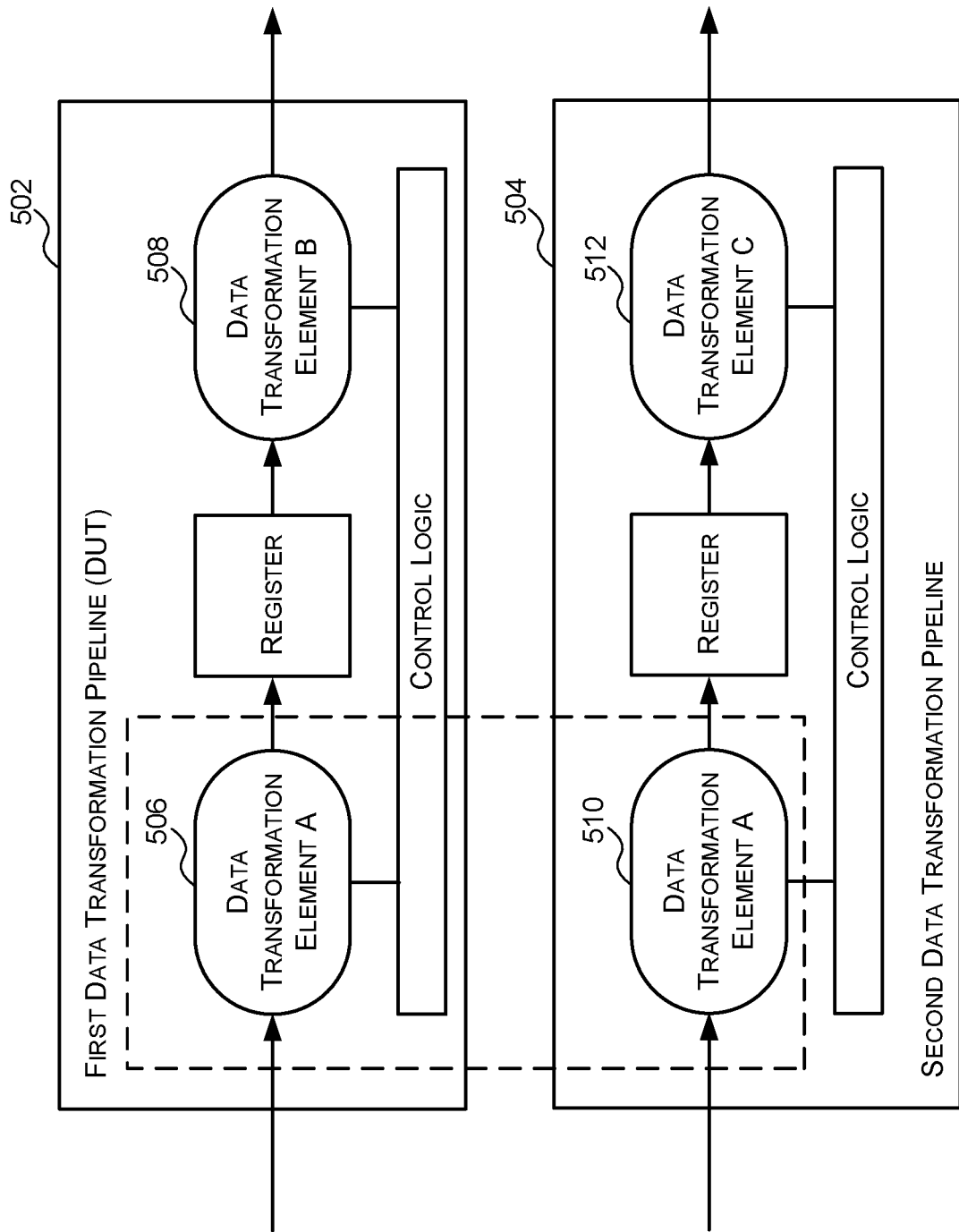
FIG. 5 is a block diagram of a first example set of first and second data transformation pipelines wherein the first and second data transformation pipelines are different.
Figure 6:
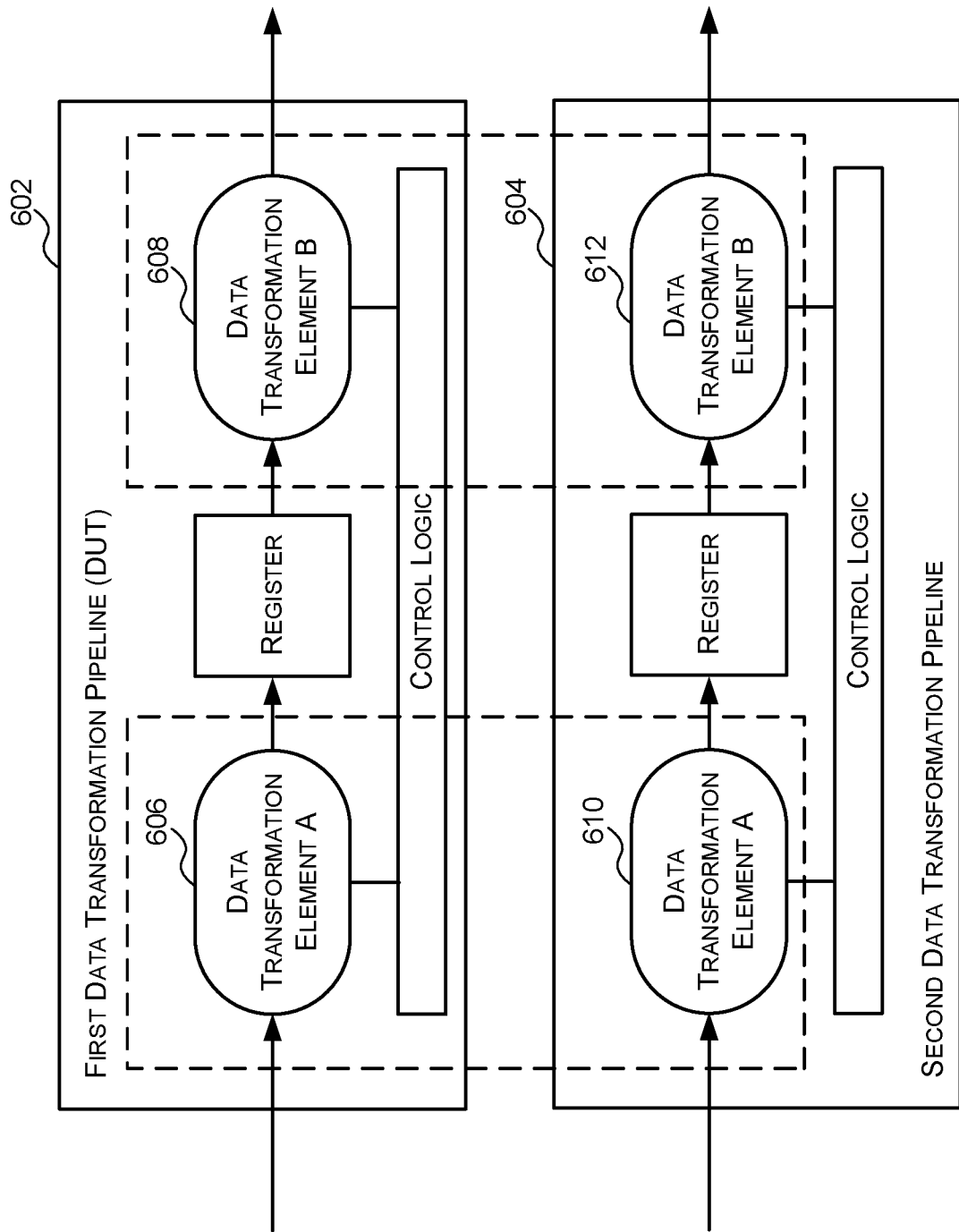
FIG. 6 is a block diagram of a second example set of first and second data transformation pipelines wherein the first and second data transformation pipelines are the same.

For example, FIGS. 5 and 6 illustrate example first and second data transformation pipelines 502, 504, 602, 604 each of which comprise a plurality of data transformation elements 506, 508, 510, 512, 606, 608, 610, 612. In the example of FIG. 5 the first and second data transformation pipelines 502, 504 are different, but comprise substantially equivalent data transformation elements 506, 510. Thus, in this example, either or both of the substantially equivalent data transformation elements 506, 510 may be black boxed (i.e. replaced with a black box element). In contrast, in the example of FIG. 6 the first and second data transformation pipelines 602, 604 are the same thus each of the data transformation elements 606, 608 of the first data transformation pipeline 602 has an identical data transformation element 610, 612 in the second data transformation pipeline 604. All of the data transformation elements in this example thus have a substantially equivalent data transformation element. Therefore, in the example of FIG. 6, any or all of the data transformation elements 606, 608, 610, 612 may be black boxed (i.e. replaced with a black box element).

The process of replacing a component in a hardware design with a black box element is referred to as black boxing the component. As is known to those of skill in the art, when a component in a hardware design is black boxed it cuts out the logic driving the output(s) of the component and makes the output(s) 'free', meaning the output(s) can take any value regardless of the input(s). Accordingly, even if the black box element receives the same input value(s) at two different times it may generate different output value(s). Black boxing may alternatively be described as replacing the logic driving the output of a data transformation element with a cutpoint or a stopat.

Since black boxing a data transformation element of a data transformation pipeline removes the transformation logic from the pipeline (which infinite time formal verification tools are typically unable to handle) the more data transformation elements that are black-boxed the higher the probability that the formal verification will converge (i.e. produce a conclusive answer). This is because black boxing a data transformation element means that the formal verification tool does not have to calculate the result of that data transformation element. However, the more data transformation elements that are black-boxed the higher the probability of false negatives (i.e. the higher the probability that the formal verification will fail even though there is no error in the hardware design). This is because removing the driving logic for certain signals may mean that one or more previously unreachable states of the hardware design become reachable. Some of these states may cause the formal verification to fail, but they wouldn't be reachable in the actual hardware design, so this is a false failure (i.e. a false negative).

Specifically, if none of the substantially equivalent data transformation elements are black-boxed then the formal verification is more likely to converge than the formal verification performed without the constraint but is less likely to converge than if the substantially equivalent data transformation elements of the first data transformation pipeline and/or second data transformation pipeline are black-boxed. However, the probability of false negatives is zero. In contrast, if the substantially equivalent data transformation elements of both the first and second data transformation pipelines are black boxed then the formal verification is significantly more likely to converge. This is because there are fewer data transformations for the formal verification tool to perform. However, the probability of false negatives is increased. This is because false negatives may now be possible (i.e. unreachable states may now be reachable). If, however, the substantially equivalent data transformation elements of only one of the first and second data transformation pipelines are black boxed—i.e. if the substantially equivalent data transformation elements of the first data transformation pipeline are black boxed and the substantially equivalent data transformation elements of the second data transformation pipeline are not black boxed, or if the substantially equivalent data transformation elements of the second data transformation pipeline are black boxed and the substantially equivalent data transformation elements of the first data transformation pipeline are not black boxed—the formal verification is more likely to converge than if none of the data transformation elements are black boxed but is less likely to converge than if the substantially equivalent data transformation elements of both data transformation pipelines are black boxed. However there is a lower probability of false negatives than if the substantially equivalent data transformation elements of both data transformation pipelines are black boxed. This is summarised in Table 1 shown below.

TABLE 1

| Method Number | Black-Box Data Transformation Elements of First Data Transformation Pipeline (Data Transformation Pipeline under test) | Black-Box Data Transformation Elements of Second Data Transformation Pipeline | Probability of Convergence of Formal Verification | Probability of False Negatives |
|---|---|---|---|---|
| 1 | No | No | Lower than methods 2, 3 and 4 | Zero |
| 2 | No | Yes | Higher than method 1, but lower than method 4 | Higher than method 1 |
| 3 | Yes | No | Higher than method 1, but lower than method 4 | Higher than method 1 |
| 4 | Yes | Yes | Higher than methods 1, 2 and 3 | Higher than methods 2 and 3 |

However, one significant benefit of the verification methods described herein is that regardless of which, and how many, data transformation elements are black-boxed there will be no false positives (i.e. the formal verification will not be successful if there is an error in the hardware design for the first data transformation pipeline which will cause an instantiation of the hardware design to act in an erroneous manner).

If substantially equivalent data transformation elements of the first data transformation element are black boxed, then the constraint(s) control the output of the black box elements that replaced the corresponding data transformation elements. This is because the constraints control the output(s) (i.e. output signal(s)) of the substantially equivalent data transformation elements based on the inputs thereto thus if a substantially equivalent data transformation element is replaced by a black box element the output(s) (i.e. output signal(s)) of the black box element are still controlled in the same way based on the inputs. This causes the black box elements to act in a deterministic way. Without the constraint(s) the output(s) of any black boxed element of the first data transformation pipeline are 'free' meaning they can take on any value independent on the input(s) and thus may generate different output(s) to the same input(s). Accordingly, if the output(s) of the black box elements of the first data transformation element were not controlled by the constraints the formal verification would likely fail as there would inevitably be a scenario where the instantiations of the hardware designs received the same pipeline input(s) but produced different output(s) even if the designs were configured properly.

In cases where the data transformation elements of the first data transformation pipeline are not black boxed and the data transformation elements of the second data transformation pipeline are black boxed (i.e. method 2 in Table 1) and an earlier transaction of the second data transformation pipeline is compared to a later transaction of the first data transformation pipeline the assumptions are said to back propagate. Specifically, a formal verification tool considers an assertion evaluated under one or more constraints (e.g. assumptions) to be valid in cycle n when there are no states which satisfy the assumptions up to and including cycle n, but fail the assertion in cycle n. This means that any states from the past which inevitably leads to failing the assumption now (or in the past) will be excluded. This can cause back propagation of the assumption(s).

If a verification method is used in which there is a possibility of false negatives (i.e. a method in which one or more data transformation elements are black-boxed) then restrictions or constraints may be placed on the output of one or more black box elements to ensure that the black box elements will not generate unexpected outputs or outputs with unexpected properties (i.e. outputs which could not be validly generated by the corresponding data transformation element). Such restrictions may be imposed on the black box element by, for example, generating an assumption and linking the assumption to the hardware design for the first data transformation pipeline. For example, if a data transformation element is configured to generate the square of an input, the downstream components may expect for the data transformation element to output a number greater than or equal to zero. In this example an assumption may be generated for the black box element that replaces this data transformation element that states that the output of the black box element is greater than or equal to zero. Similarly, if a data transformation element is configured to output the sine of the input then an assumption may be generated for the black box element that replaces that data transformation element that states that the output of the black box element is between −1 and 1 inclusive. Generally a property is not assumed during formal verification until it has been proven to be true. For example, before an assumption is generated that states that the output of a data transformation element (or the black box element that replaces it) is equal to or greater than zero it is typically verified (by formal verification or other verification means) that the output of the data transformation element is always greater than or equal to zero. It will be evident to a person of skill in the art that these are examples only and that other restrictions or constraints may be imposed on the output of a black box element. In some cases, if the false negatives associated with a particular verification method cannot be removed via constraints or restrictions imposed on the output(s) of the black box element(s) then the particular method may not be considered a viable verification method.

Figure 7:
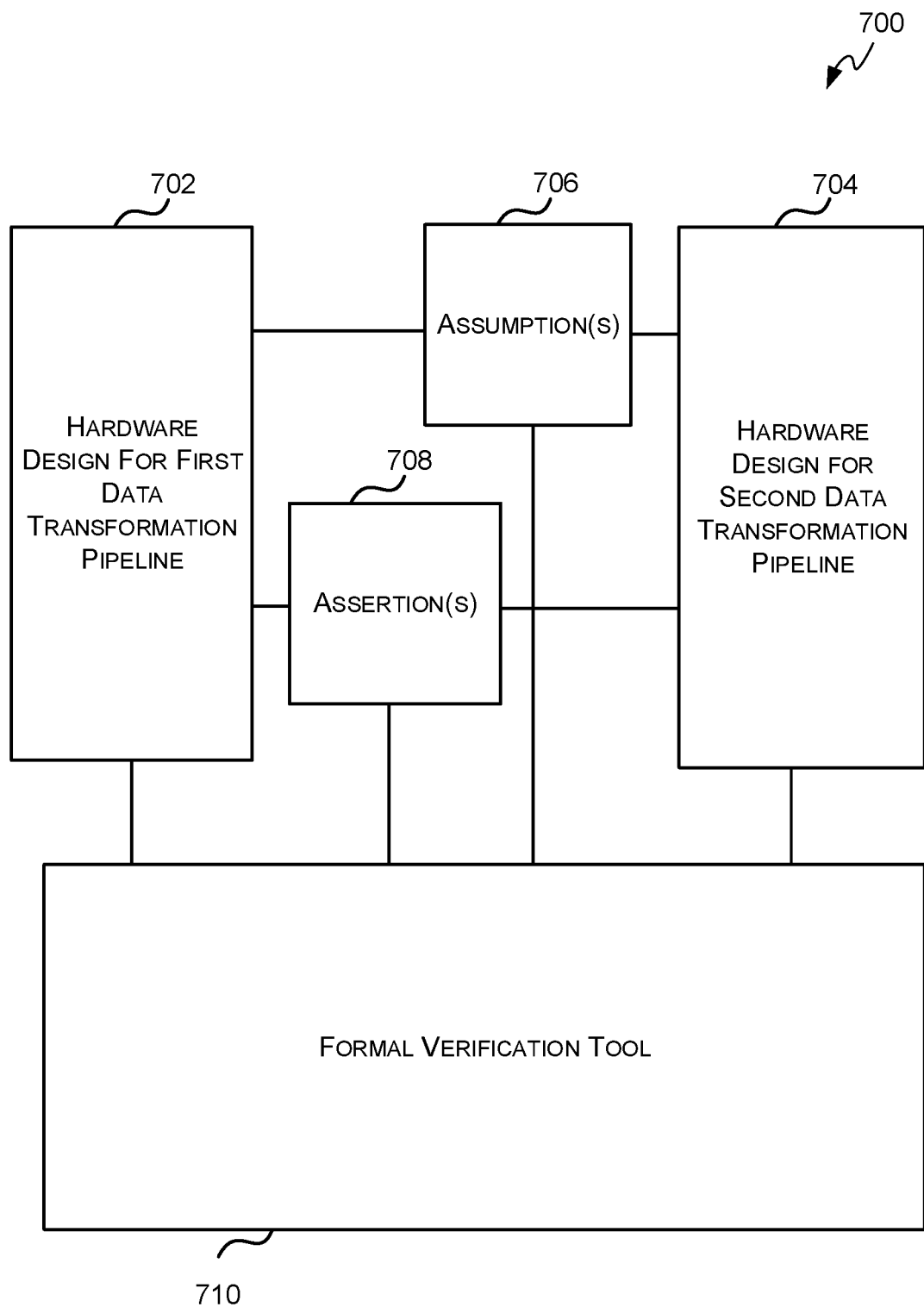
FIG. 7 is a block diagram of an example system for verifying a hardware design for a data transformation pipeline.

Reference is now made to FIG. 7 which illustrates an example system 700 in accordance with the first embodiment for verifying a hardware design for a first data transformation pipeline. The system 700 may be implemented by one or more computing-based devices, such as the computing-based device 1400 described below with respect to FIG. 14. For example, one or more of the components of the system 700 of FIG. 7 may be implemented as computer readable instructions, which when executed by a computing-based device, cause the computing-based device to perform the functions of the component described below.

The system 700 comprises a hardware design for a first data transformation pipeline 702, a hardware design for a second data transformation pipeline 704, one or more assumptions 706, one or more formal assertions 708 and a formal verification tool 710.

The hardware designs for the first and second data transformation pipelines 702, 704 comprise a description of the structure and/or function of the first or second data transformation pipelines respectively. The first and second data transformation pipelines each comprise one or more data transformation elements that are configured to perform a data transformation on a set of one or more inputs. The first and second data transformation pipelines are intended to be functionally equivalent (i.e. they are intended to produce the same pipeline output(s) in response to the same pipeline input(s)). The first and second data transformation pipelines may be identical, or they may be different. In either case, there is at least one data transformation element of the first data transformation pipeline that is substantially equivalent to a data transformation element of the second data transformation pipeline. In some cases, the substantially equivalent data transformation elements of the first and/or second data transformation elements may be black boxed. The advantages and disadvantages of black boxing the substantially equivalent data transformation elements of either or both of the first and second data transformation pipelines were described above.

The one or more assumptions 706 constrain the behaviour of the substantially equivalent data transformation element(s) (or the corresponding black box element(s)) of the first data transformation pipeline to act in the same manner as the corresponding data transformation element of the second data transformation pipeline. In other words, the one or more assumptions constrain the behaviour of the substantially equivalent data transformation elements of the first data transformation pipeline so that when a substantially equivalent data transformation element of the first data transformation pipeline receives the same inputs as its corresponding data transformation element of the second data transformation pipeline it generates the same output(s). The one or more assumptions are linked to the hardware designs for the first and second data transformation pipelines so that the inputs of the substantially equivalent data transformation elements of the first and second data transformation pipelines are linked.

As is described in more detail below, when the system is used to verify that two hardware designs are functionally equivalent (i.e. that instantiations of the hardware designs will always produce the same outputs in response to the same inputs) the assumption may state that whenever the substantially equivalent data transformation elements of the first and second data transformation pipelines receive the same inputs at the same time, or at related points in time, that their output(s) are the same. In contrast, when the system is used to verify that a single hardware design is consistent (i.e. that an instantiation of the hardware design will produce the same output to any transaction regardless of when the transaction is executed) the assumption may state that if the substantially equivalent data transformation element of the second data transformation pipeline receives a set of one or more inputs and produces a set of one or more outputs as part of a transaction executed from a predetermined state, that if the substantially equivalent data transformation element of the first data transformation pipeline receives the same set of inputs at any time that it will produce the same set of outputs. In these cases, since the two hardware designs are the same the substantially equivalent data transformation elements will be identical.

The assertions 708 comprise one or more assertions, which if verified to be true for the hardware design for the first data transformation pipeline prove that instantiations of the first and second hardware designs will produce the same output(s) for a predetermined set of transactions. As is known to those of skill in the art, an assertion is a statement that a particular property is expected to hold for the hardware design (i.e. is always true). As described in more detail below, when the system 700 is used to verify that instantiations of two different hardware designs always produce the same output(s) the one or more assertions may be configured to compare the output(s) of the instantiations of the hardware designs when they execute the same transaction from the same state. In contrast, when the system 700 is used to verify that an instantiation of a hardware design is consistent (i.e. will always produce the same output to a transaction regardless of when the transaction is executed) the one or more assertions may be configured to compare the output(s) of the instantiation of the hardware design for the second data transformation pipeline when it executes transactions from a predetermined state of the pipeline to the output(s) of the instantiation of the hardware design for the first data transformation pipeline when it executes the same transaction from any other state of the pipeline. Example assertions which may be used in these cases are described below.

The one or more assertions 708 are linked to the hardware designs for the first and second data transformation pipelines so that the one or more assertions are connected to the relevant signals of the hardware designs so as to be able to evaluate the asserted property/properties. As described above, the one or more assertions may be linked to the hardware designs by binding the one or more assertions 708 to the hardware designs for the first and second data transformation pipelines.

As described above, the formal verification tool 710 is a software tool that is capable of performing formal verification of a hardware design. Since the formal verification ideally verifies the one or more assertions over infinite time it may be advantageous to use an infinite time formal verification tool.

The hardware design for the first data transformation pipeline 702, the hardware design for the second data transformation pipeline 704, the one or more assumptions 706, the one or more assertions 708, and the bindings (if any) are loaded in the formal verification tool 710. The formal verification tool 710 is then configured to formally verify the one or more assertions are true for the hardware design for the first data transformation pipeline.

When the formal verification tool 710 is used to verify an assertion, the formal verification tool 710 may output an indication of whether or not the assertion is valid (i.e. the asserted property is true for all valid states or sequence of states), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 710 has run out of memory or because the formal verification tool 710 has determined that a certain amount of progress has not been made after a predefined period of time.

Where an assertion is not valid or has not been successfully verified, the formal verification tool 710 may also output information indicating a state or sequence of states of the hardware design which causes the assertion to fail. For example, the formal verification tool 710 may output a trace of the verification indicating at what point, state or sequence of states the failure occurred.

Figure 8:
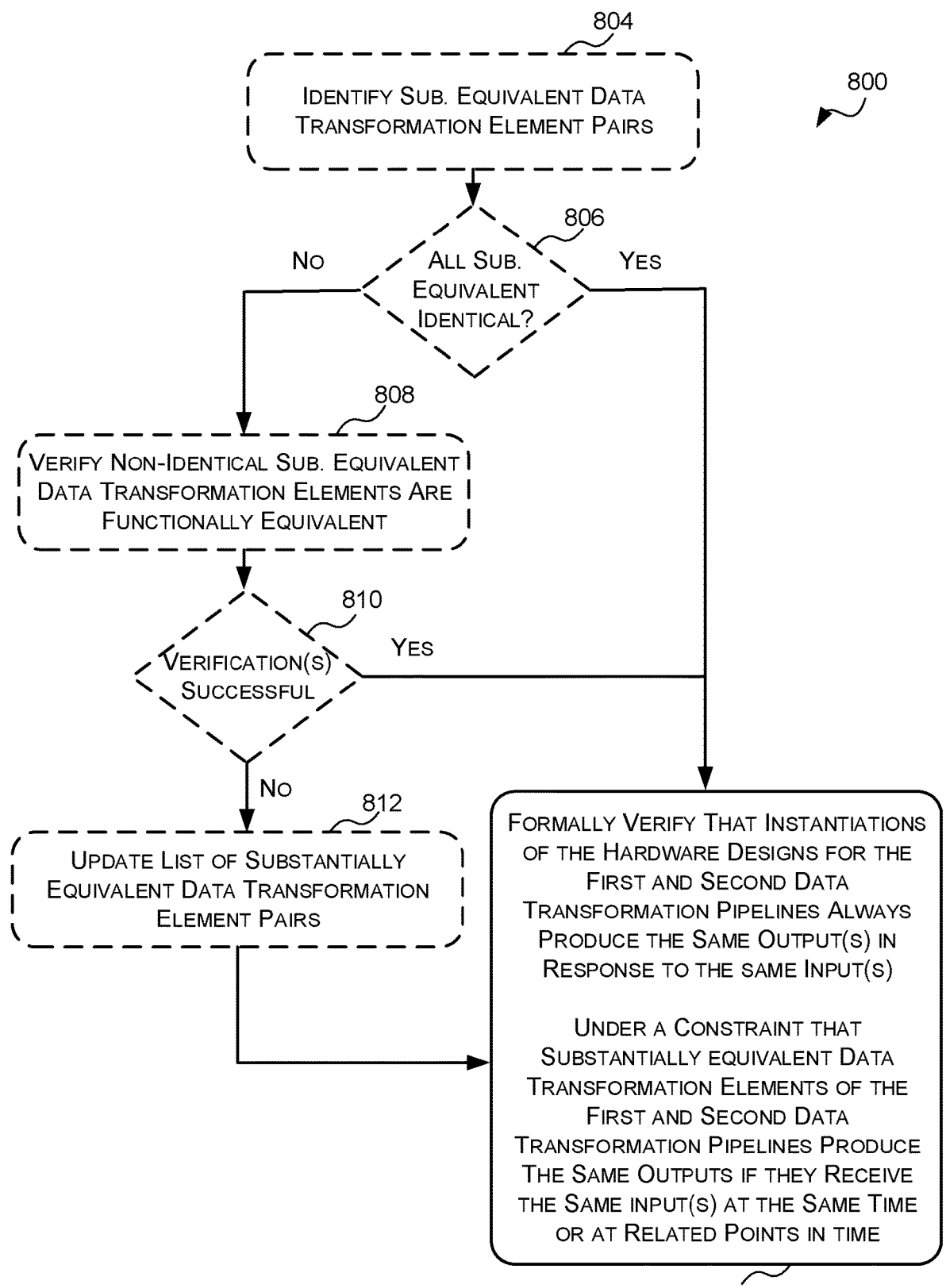
FIG. 8 is flow diagram of an example method for implementing the formal verification step of the method of FIG. 4 to verify a hardware design for a data transformation pipeline is functionally equivalent to a hardware design for another data transformation pipeline.

Reference is now made to FIG. 8 which illustrates an example method 800 for implementing step 402 of the method 400 of FIG. 4 when the method 400 is used to verify that a hardware design for a first data transformation pipeline is functionally equivalent to a hardware design for a second data transformation pipeline (i.e. that an instantiation of the hardware design for the first data transformation pipeline and an instantiation of the hardware design for the second data transformation pipeline will always produce the same output(s) in response to the same input(s)).

In the method 800 of FIG. 8 the first and second data transformation pipelines are different (i.e. they are not identical), but there is at least one pair of substantially equivalent data transformation elements in the first and second data transformation pipelines. Specifically, there is at least one data transformation element of the first data transformation pipeline that is substantially equivalent to at least one data transformation element of the second data transformation pipeline. Two data transformation elements are "substantially equivalent" if they are identical or if they are functionally equivalent. Two data transformation elements are functionally equivalent if they always produce the same output(s) in response to the same input(s). The substantially equivalent pairs of data transformation elements in the first and second data transformation pipelines may be identified manually (e.g. by a person) or may be identified automatically. For example, a computing-based device, such as the computing-based device 1400 of FIG. 14 may be configured to automatically identify substantially equivalent data transformation elements by identifying identical pieces of code in the hardware designs for the first and second data transformation pipelines.

In the method 800 of FIG. 8 the functional equivalence of the hardware designs for the first and second data transformation pipelines is verified by formally verifying that for any set of pipeline inputs the instantiations of the hardware designs for the first and second data transformations will produce the same set of outputs. The formal verification is performed under a constraint that the substantially equivalent data transformation elements of the first and second data transformation pipelines produce the same output(s) in response to the same input(s). As described above, the inventor has identified that performing the formal verification under such a constraint significantly improves the likelihood that the formal verification will converge.

The method 800 begins at block 802 where it is formally verified, using a formal verification tool, that for any set of pipeline inputs that instantiations of the hardware designs for the first and second data transformation pipelines will produce the same set of outputs.

Formally verifying that for any set of pipeline inputs that instantiations of the hardware designs for the first and second data transformation pipelines will produce the same set of output(s) may comprise generating one or more assertions and formally verifying the one or more assertions. For example, in some cases the input(s) to the instantiations of the hardware designs for the first and second data transformation pipelines may be tied together so that during the formal verification the instantiations receive the same input(s). In these cases, an assertion may be generated that states that for any set of inputs the corresponding set of output(s) are the same.

Where the first and second data transformation pipelines are configured to process a transaction (i.e. a set of pipeline inputs) in the same number of cycles (e.g. both the first and second data transformation pipelines are configured to process a transaction in 5 cycles) the assertion may be as simple as stating that the outputs of instantiations of the hardware designs for the first and second data transformation pipelines are the same. The following is an example SV assertion which may be used in this case where first_pipe_output is the output of the instantiation of the hardware design for the first data transformation pipeline and second_pipe_output is the output of the instantiation of the hardware design for the second data transformation pipeline:

assert_output: assert property
(first_pipe_output==second_pipe_output)

It will be evident to a person of skill in the art that this assertion states that the output of the instantiation of the hardware design for the first data transformation pipeline (first_pipe_output) is equal to the output of the instantiation of the hardware design for the second data transformation pipeline (second_pipe_output). A formal verification tool verifies the assertion by determining whether there is a state of the instantiation of the hardware design for the first data transformation pipeline when the assertion is not true (i.e. when the outputs do not match). If there is no such state, then the assertion is said to be successfully verified. Accordingly, this assertion will fail if there is at least one state of the instantiation of the hardware design for the first data transformation pipeline where the outputs of the instantiations of the hardware designs do not match.

Where the first and second data transformation pipelines are not configured to process a transaction (i.e. a set of pipeline inputs) in the same number of cycles (e.g. the first data transformation pipeline may be configured to process a transaction in 5 cycles whereas the second data transformation pipeline may be configured to process a transaction in 7 cycles) the assertion takes into account the delay or offset between the outputs. For example, the following is an example SV assertion which may be used where the first data transformation pipeline produces an output to a transaction n cycles after the second data transformation pipeline produces an output to the same transaction wherein first_pipe_output is the output of the instantiation of the hardware design for the first data transformation pipeline and second_pipe_output is the output of the instantiation of the hardware design for the second data transformation pipeline. As is known to those of skill in the art "$past (a, b)" is an SV operator that returns the value of a, b cycles ago (or b cycles in the past).

assert_output: assert property (first_pipe_output ==
$past(second_pipe_output, n))

It will be evident to a person of skill in the art that this assertion states that the output of the instantiation of the hardware design for the first data transformation pipeline (first_pipe_output) is equal to the output of the instantiation of the hardware design for the second data transformation pipeline (second_pipe_output)n cycles ago.

The formal verification is performed under a constraint that if substantially equivalent data transformation elements of the first and second data transformation pipelines receive the same input(s) at the same time, or related points in time, that that they will produce the same outputs in response to the input(s). For example, the example first and second data transformation pipelines 502, 504 of FIG. 5 comprise one pair of substantially equivalent data transformation elements 506 and 510. In this example, the formal verification may be performed under a constraint that when data transformation element 506 and data transformation element 510 receive the same input(s) at the same time, or at related points in time that they produce the same output(s). Where there are multiple pairs of substantially equivalent data transformation elements, the constraint may be applied to any combination of substantially equivalent pairs of data transformation elements. For example, the constraint may be applied to: only one pair of substantially equivalent data transformation elements; more than one pair of substantially equivalent data transformation elements; or all pairs of substantially equivalent data transformation elements.

In some cases, one or more substantially equivalent pairs of data transformation elements may be time aligned. Two substantially equivalent data transformation elements are said to be "time aligned" when for the same transaction they will receive the same inputs at the same time (i.e. in the same cycle). In these cases, the constraint related to those substantially equivalent data transformation element pairs may be that when the substantially equivalent data transformation elements receive the same input(s) at the same time that they produce the same output(s). In some cases, one or more substantially equivalent pairs of data transformation elements may be time offset. Two data transformation elements are said to be "time offset" when for the same transaction they will receive the same inputs at related points in time (e.g. a fixed number of cycles apart). For example, the data transformation element 510 may always receive the input(s) for a particular transaction two cycles after the data transformation element 506 receives the input(s) for that transaction. In these cases, the constraint related to those substantially equivalent data transformation element pairs may be that when the substantially equivalent data transformation elements receive the same inputs at related points in time (e.g. a fixed number of cycles apart) that they produce the same output(s). In some cases, one or more substantially equivalent pairs of data transformation elements may not have a fixed time relationship but there will be a limited set of offsets which may occur. For example, the substantially equivalent data transformation elements may be offset by one of 5, 7 and 9 cycles. In these cases, the constraint related to those substantially equivalent data transformation pairs may be that when the substantially equivalent data transformation elements receive the same inputs at one of a predetermined set of related points in time (e.g. at one of a predetermined set of cycle offsets) that they produce the same output(s).

As described above, the constraint may be implemented as one or more assumption statements. An example assumption written in SV for the substantially equivalent data transformation elements 506, 510 of FIG. 5 where the substantially equivalent data transformation elements 506, 510 are time aligned (i.e. they will receive the input(s) to the same transaction at the same time) is shown below. In this example assumption, input_DTE_first_pipe is the input to the data transformation element (DTE) 506 of the first data transformation pipeline 502, input_DTE_second_pipe is the input to the data transformation element (DTE) 510 of the second data transformation pipeline, output_DTE_first_pipe is the output of the data transformation element (DTE) 506 of the first data transformation pipeline 502, output_DTE_second_pipe is the output to the data transformation element (DTE) 510 of the second data transformation pipeline.

assume property ((input_DTE_first_pipe == input_DTE_second_pipe)
|->
(output_DTE_first_pipe == output_DTE_second_pipe));

As will be understood to a person of skill in the art, this example assumption assumes that if the inputs to the substantially equivalent data transformation elements 506, 510 of the first and second data transformation pipelines are the same (input_DTE_first_pipe==input_DTE_second_pipe) then the corresponding outputs of the substantially equivalent data transformation elements 506, 510 of the first and second data transformation pipelines are the same (output_DTE_first_pipe==output_DTE_second_pipe)).

Testing has shown that performing the formal verification under such a constraint increases the likelihood that the formal verification will converge. Once the formal verification is complete the method 800 ends.

In some cases, prior to performing the formal verification of block 802, one or more of blocks 804 to 812 may be performed. For example, prior to performing the formal verification of block 802 a list of potential substantially equivalent data transformation element pairs in the first and second data transformation pipelines may be identified at block 804. The potential substantially equivalent pairs of data transformation elements in the first and second data transformation pipelines may be identified manually (e.g. by a person) or may be identified automatically. For example, a computing-based device, such as the computing-based device 1400 of FIG. 14 may be configured to automatically identify substantially equivalent data transformation elements by identifying identical pieces of code in the hardware designs for the first and second data transformation pipelines. Once a list of potential substantially equivalent data transformation element pairs has been identified the method 800 may proceed to block 806.

At block 806, a determination is made whether any of the potential pairs of substantially equivalent data transformation elements identified in block 804 are not identical (i.e. are not formed of, or defined by identical code, in the respective hardware designs). If it is determined that at least one pair of substantially equivalent data transformation elements are not identical then the method 800 may proceed to block 808, otherwise the method 800 may proceed directly to block 802 where the potential list of substantially equivalent pairs of data transformation elements is used as the list of substantially equivalent pairs of data transformation elements in the formal verification of the hardware design for the first data transformation pipeline.

At block 808, where at least one pair of substantially equivalent data transformation elements identified in block 804 are not identical then it is verified, for each pair of non-identical substantially equivalent data transformation elements, that the substantially equivalent data transformation elements are functionally equivalent. Verifying that a pair of data transformation elements are functionally equivalent may comprise formally verifying (by, for example, formally verifying one or more assertions) that the two data transformation elements always produce the same output(s) in response to the same input(s). Once the verification of the functional equivalence of the non-identical data transformation element pairs is complete the method 800 proceeds to block 810.

At block 810, a determination is made as to whether the verifications in block 808 were successful. If all of the verifications were successful, then the method 800 proceeds directly to block 802 where the list of potential substantially equivalent pairs of data transformation elements is used as the list of substantially equivalent pairs of data transformation elements in the formal verification of the hardware design for the first data transformation pipeline. If, however, at least one of the verifications in block 808 was not successful then the method 800 proceeds to block 812 where the list of potential substantially equivalent pairs of data transformation elements is updated to exclude any pairs for which the verification in block 808 was unsuccessful. The method 800 then proceeds to block 802 where the updated list of potential substantially equivalent pairs of data transformation elements is used in the formal verification of the hardware design for the first data transformation pipeline. In this way a constraint (e.g. assumption) will only be imposed on data transformation element pairs that are identical or have been proven to be functionally equivalent. This is because it is not safe to assume, during formal verification, that two non-identical data transformation elements will produce the same outputs in response to the same inputs unless this has been proven to be true.

Figure 9:
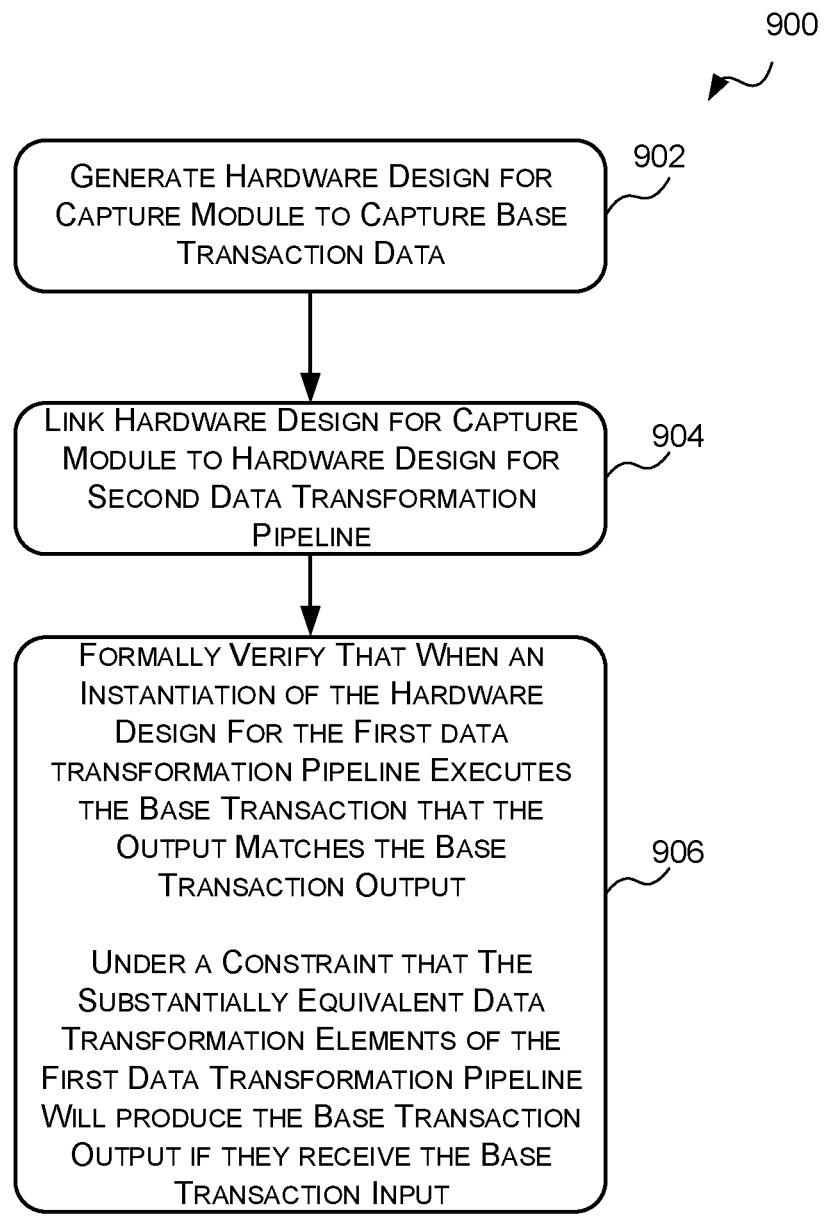
FIG. 9 is flow diagram of an example method for implementing the formal verification step of the method of FIG. 4 to verify a hardware design for a data transformation pipeline is consistent.

Reference is now made to FIG. 9 which illustrates an example method 900 for implementing step 402 of the method 400 of FIG. 4 when the method 400 is used to verify that a hardware design for a first data transformation pipeline is consistent (i.e. that an instantiation of the hardware design will always produce the same result to the same transaction (i.e. same set of pipeline input(s)) regardless of when the transaction is executed). In this method 900 the first and second data transformation pipelines are the same (i.e. they are identical). In other words, in this method 900 the hardware designs for the first and second data transformation pipelines are two copies of the same hardware design.

In the method 900 of FIG. 9 the consistency of the hardware design for the first data transformation pipeline is verified by verifying that if an instantiation of the hardware design for the data transformation pipeline executes a transaction from a predetermined state that the instantiation of the hardware design will produce the same output if an instantiation of the hardware design for the data transformation pipeline executes the same transaction from any other state. This is done by recording the inputs and outputs to the pipeline, and the inputs and outputs to one or more data transformation elements when an instantiation of the hardware design for the second data transformation pipeline executes a transaction (referred to herein as the watched transaction) from a predetermined state of the pipeline (e.g. the state that occurs after a reset of the instantiation of the hardware design). The recorded data may be collectively referred to as the watched transaction data. It is then formally verified that if an instantiation of the hardware design for the first data transformation pipeline executes the watched transaction that it produces the recorded pipeline outputs. The formal verification tool will verify that the output of the instantiation of the hardware design for the first data transformation pipeline matches the recorded pipeline output for each possible watched transaction (i.e. for each possible set of inputs) when the watched transaction is executed from any state. This verifies that, for any watched transaction (i.e. that for any set of pipeline inputs), the instantiation of the hardware design will produce the same output to the watched transaction regardless of when the watched transaction is executed.

The method 900 begins at block 902 where a hardware design for a capture module is generated. The capture module is configured to capture watched transaction data for the second data transformation pipeline. The watched transaction data comprises a record of pipeline input(s) and output(s) for a watched transaction (i.e. a transaction executed from a predetermined state of the pipeline); and a record of the input(s) to, and output(s), from one or more data transformation elements for the watched transaction. Where the output of a data transformation element represents the pipeline output then the pipeline output may not be recorded separately from the input and outputs of the data transformation element but may be deduced from the outputs of the relevant data transformation element. Similarly, where the inputs to one or more of the data transformation elements represent the pipeline inputs then the pipeline inputs may not be recorded separately from the inputs and outputs of the data transformation elements. In some cases, the capture module may be configured to record the inputs and outputs in one or more storage elements (e.g. one or more registers).

Accordingly, the hardware design for the capture module defines the function and structure of logic configured to monitor the input and output signals of at least one data transformation element (or corresponding black box element) of an instantiation of the hardware design for the second data transformation pipeline and store, in one or more storage elements (e.g. one or more registers), the value of each input and output signal for a transaction executed from a predetermined state of the pipeline. In other words, the logic is configured to capture the inputs and outputs of the at least one data transformation element (or corresponding black box element) for a transaction executed by an instantiation of the hardware design for the second data transformation pipeline from a predetermined state of the pipeline.

For example, the example data transformation pipeline 100 of FIG. 1 is configured to calculate the sum of eight inputs $(a_0+a_1+a_2+a_3+a_4+a_5+a_6+a_7)$. The data transformation pipeline 100 of FIG. 1 comprises a single data transformation element 102 which is configured to output the sum of two inputs. To execute a transaction (calculate the sum of eight inputs) the data transformation element 102 is used in eight cycles—in each of these eight cycles the data transformation element 102 receives two inputs—a new input value and an input representing the sum of the previous inputs—and outputs the sum of the two inputs. Accordingly, capturing the input and output signals of the data transformation element 102 of an instantiation of the hardware design for the second data transformation pipeline for a transaction executed from a predetermined state comprises capturing the input and output signals of the data transformation element 102 for eight consecutive cycles from the predetermined state (assuming there are no stalls or other events which extend the calculation). In this case, since the inputs to the pipeline $(a_0, a_1, a_2, a_3, a_4, a_5, a_6, a_7)$ are a subset of the inputs to the data transformation element 102 and the pipeline output $(y_7)$ is equal to one of the outputs of the data transformation element 102 the pipeline inputs and outputs can be deduced from the inputs and outputs recorded for the data transformation element and do not need to be stored or recorded separately.

Figure 2:
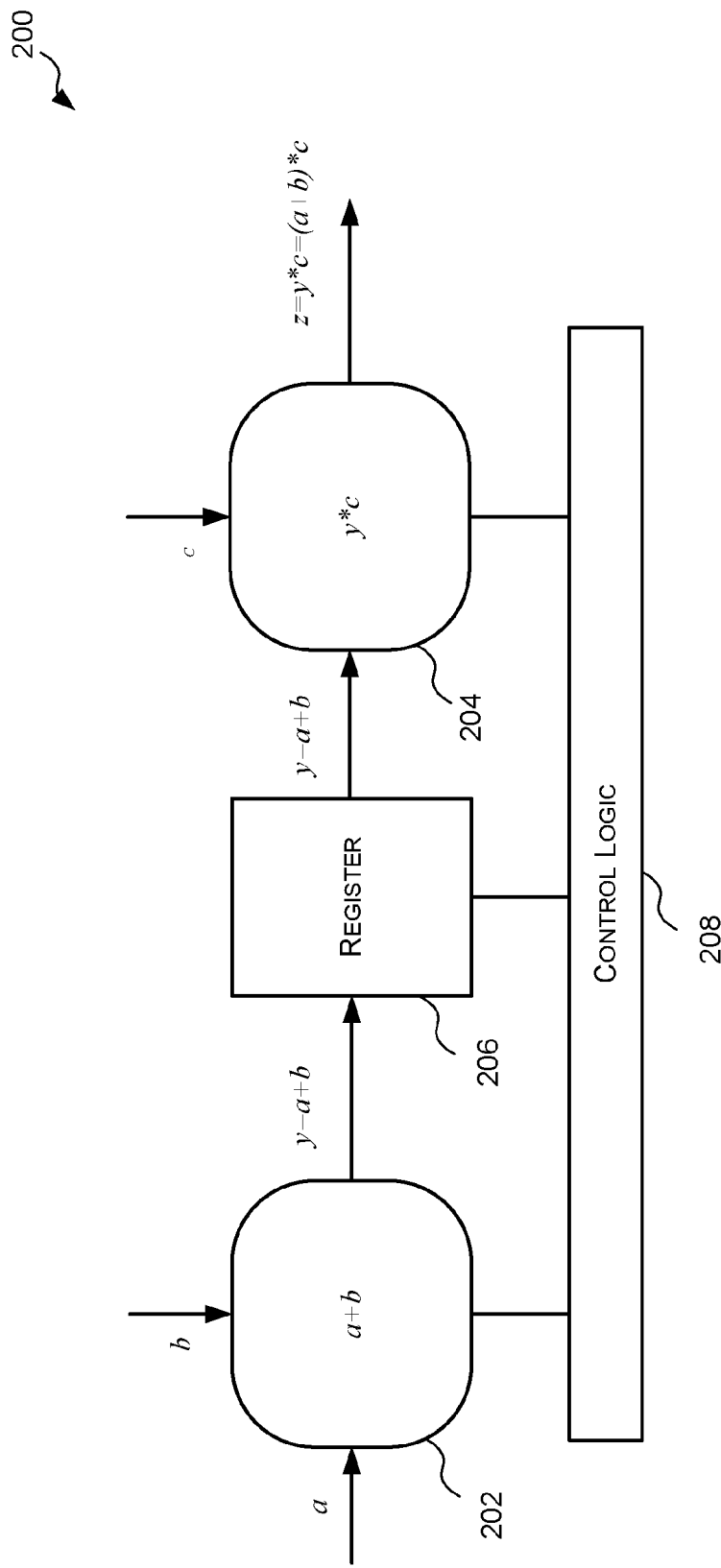
FIG. 2 is a block diagram of a second example data transformation pipeline.

Similarly, the example data transformation pipeline 200 of FIG. 2 is configured to calculate (a+b)*c. The example data transformation pipeline 200 of FIG. 2 comprises two data transformation elements—a first data transformation element 202 configured to calculate the sum of the inputs a and b, and a second data transformation element 204 configured to calculate the product of the output of the first data transformation element y and the input c. Thus, to execute a transaction the data transformation element 202 is used in a first cycle and the second data transformation element 204 is used in a second cycle. Accordingly, capturing the input and output signals of the data transformation elements 202, 204 of an instantiation of the hardware design for the second data transformation pipeline for a transaction executed from a predetermined state comprises capturing the input and output signals of the first data transformation element 202 in the first cycle from the predetermined state, and capturing the input and output signals of the second data transformation element 204 in a second cycle from the predetermined state of the pipeline.

Where it is described herein that a transaction is executed from a predetermined state of the pipeline the phrase "state" of the pipeline is used herein to describe the variable elements of a hardware design, and their current values. In some cases, the predetermined state may be the state occurring immediately after reset. However, it will be evident to a person of skill in the art that this is an example only, and that other states of the pipeline may be used as the predetermined state. For example, in other cases the predetermined state may be the state that arises after reset, a first random transaction and a stall.

The hardware design for the capture module may be implemented in, for example, a hardware description language (HDL), such as VHDL, or it may be implemented in an assertion-based language, such as, but not limited to SVA. The following is example SVA code representing a hardware design for a capture module for the hardware design for the example data transformation pipeline 100 of FIG. 1. In this example add.a is the input a to the data transformation element 102, add.b is the input b to the data transformation element 102, add.y is the output y of the data transformation element 102, stored_add_a is a register used to store the input a values to the data transformation element 102, stored_add_b is a register used to store the input b values to the data transformation element 102, stored_add_y is a register used to store the output y values of the data transformation element 102, cycles_since_reset is the number of cycles since reset, and MAX_CYCLES are the maximum number of cycles for which the inputs and outputs of the data transformation element 102 are recorded (which may be 7 for the example data transformation pipeline 100 of FIG. 1 when the count starts at 0).

```
always @ (posedge clk)
    begin
        if (cycles_since_reset <= MAX_CYCLES)
            begin
                stored_add_a [cycles_since_reset] <= add.a;
                stored_add_b [cycles_since_reset] <= add.b;
                stored_add_y [cycles_since_reset] <= add.y;
            end
    end
```

It will be evident to a person of skill in the art, that this example capture module causes the inputs (a and b) and output (y) of the data transformation element 102 to be added to stored_add_a, stored_add_b and stored_add_y respectively each cycle after reset up to the MAX_CYLES (which may be 7 for the example data transformation pipeline 100 of FIG. 1 if the first cycle is cycle 0). Tables 2-4 illustrate an example of what may be stored in the registers (stored_add_a, stored_add_b and stored_add_y) where $a_i$, $b_i$, $y_i$ represent the inputs and outputs in cycle i after reset. Together the data stored in the registers forms the watched transaction data.

TABLE 2

| stored_add_a | | | | | | | |
|---|---|---|---|---|---|---|---|
| [0] | [1] | [2] | [3] | [4] | [5] | [6] | [7] |
| $a_0$ | $a_1$ | $a_2$ | $a_3$ | $a_4$ | $a_5$ | $a_6$ | $a_7$ |

TABLE 3

| stored_add_b | | | | | | | |
|---|---|---|---|---|---|---|---|
| [0] | [1] | [2] | [3] | [4] | [5] | [6] | [7] |
| $b_0$ | $b_1$ | $b_2$ | $b_3$ | $b_4$ | $b_5$ | $b_6$ | $b_7$ |

TABLE 4

| stored_add_y | | | | | | | |
|---|---|---|---|---|---|---|---|
| [0] | [1] | [2] | [3] | [4] | [5] | [6] | [7] |
| $y_0$ | $y_1$ | $y_2$ | $y_3$ | $y_4$ | $y_5$ | $y_6$ | $y_7$ |

Once the hardware design for the capture module is generated the method 900 proceeds to block 904.

At block 904, the hardware design for the capture module is linked to the hardware design for the second data transformation pipeline so that (i) the capture module is connected to the appropriate signals of the second data transformation pipeline so as to be able to monitor and capture the inputs and outputs of the relevant data transformation elements; and (ii) the hardware design for the capture module and the hardware design for the second data transformation pipeline are treated as one hardware design for the purposes of formal verification. Accordingly, once the hardware design for the capture module is linked to the hardware design for the second data transformation pipeline when the formal verification tool creates an instantiation of the hardware design for the second data transformation pipeline it includes an instantiation of the capture module.

In some cases, the hardware design for the capture module may be linked to the hardware design for the second data transformation pipeline by incorporating the hardware design for the capture module into the hardware design for the second data transformation pipeline. In other cases, the hardware design for the capture module may be linked to the hardware design for the second data transformation pipeline by binding the capture module to the hardware design for the second data transformation pipeline. For example, where the hardware design for the second data transformation is implemented in VHDL and the hardware design for the capture module is implemented in SV, the VHDL instance may be bound to the SV instance. Once the hardware design for the capture module has been linked to the hardware design for the second data transformation pipeline the method 900 proceeds to block 906.

At block 906, it is formally verified, using a formal verification tool, that if an instantiation of the hardware design for the first data transformation pipeline executes the watched transaction from any state of the pipeline that it produces the pipeline output recorded in the watched transaction data. As described above, a transaction is defined by the inputs to the pipeline. Accordingly, an instantiation of the hardware design for the first data transformation pipeline is said to execute the watched transaction if it executes a transaction on the same pipeline inputs as recorded in the watched transaction data. For example, the pipeline inputs for a transaction executed by the example data transformation pipeline 100 of FIG. 1 are $a_0$, $a_1$, $a_2$, $a_3$, $a_4$, $a_5$, $a_6$ and $a_7$. If the watched transaction data records pipeline inputs 3, 4, 2, 6, 8, 3, 9, 10 for $a_0$, $a_1$, $a_2$, $a_3$, $a_4$, $a_5$, $a_6$ and $a_7$ respectively then the formal verification proves that if an instantiation of the first version of the hardware design for the data transformation pipeline receives 3, 4, 2, 6, 8, 3, 9, 10 respectively for $a_0$, $a_1$, $a_2$, $a_3$, $a_4$, $a_5$, $a_6$ and $a_7$ from any state of the pipeline that the output of the instantiation of the hardware design for the first data transformation pipeline matches the pipeline output recorded in the watched transaction data. It is noted that this is an example only and that during the formal verification the formal verification tool will verify the property for all possible watched transactions (i.e. for all possible sets of pipeline inputs).

Verifying that if an instantiation of the hardware design for the first data transformation pipeline executes the watched transaction from any state of the pipeline that it produces the pipelined output recorded in the watched transaction data may comprises generating one or more assertions and verifying the one or more assertions. For example, an assertion may be generated that establishes that if an instantiation of the hardware design for the first data transformation pipeline receives the same pipeline inputs in the same order as the pipeline inputs recorded in the watched transaction data that it produces the pipeline output recorded in the watched transaction data. The following is an example SV assertion which may be used wherein expect_watched_output_on_first_pipe is high when an instantiation of the hardware design for the first data transformation pipeline executes the watched transaction (i.e. processes the same set of pipeline inputs in the same order recorded in the watched transaction data) and is now expected to have completed the transaction and be ready to output the result(s), first_pipe_output is the output of the instantiation of the hardware design for the first data transformation pipeline for the watched transaction, and stored output is the pipeline output recorded in the watched transaction data:

```
assert_output: assert property (expect_watched_output_on_first_pipe
|->
(stored_output == first_pipe_output)
```

It will be evident to a person of skill in the art that this assertion states that if an instantiation of the hardware design for the first data transformation pipeline executes the watched transaction that the output of the instantiation of the hardware design for the first data transformation pipeline is equal to the pipeline output recorded in the watched transaction data.

The formal verification is performed under a constraint that if the one or more data transformation elements of the first data transformation pipeline for which the inputs and outputs were recorded in the watched transaction data receives a set of inputs recorded in the watched transaction data that the data transformation element outputs the recorded set of outputs.

As described above, the constraint may be implemented as one or more assumption statements. An example assumption written in SV for the data transformation element 102 of the data transformation pipeline 100 of FIG. 1 is shown below. In this example assumption, stored_add_a[i] is the first input a recorded in the watched transaction data for the data transformation element 102 in the $i^{th}$ cycle, stored_add_b[i] is the second input b recorded in the watched transaction data for the data transformation element 102 in the $i^{th}$ cycle, stored_add_y[i] is the output y recorded in the watched transaction data for the data transformation element 102 in the $i^{th}$ cycle, first_pipe_add_a is the first input a of the data transformation element 102 of an instantiation of the hardware design for the first data transformation pipeline, first_pipe_add_b is the second input b of the data transformation element 102 of an instantiation of the hardware design for the first data transformation pipeline, first_pipe_add_y is the output y of the data transformation element 102 of an instantiation of the hardware design for the first data transformation pipeline and MAX_CYCLES is 7 in this example.

```
Generate
    for (i=0; i<=MAX_CYCLES; i=i+1) begin: add_assumptions
        assume_add: assume property ((stored_add_a[i] ==
        first_pipe_add_a) && (stored_add_b[i] ==
first_pipe_add_b)
        |-> (stored_add_y[i] == first_pipe_add_y));
    end
end
```

As would be evident to a person of skill in the art, this example assumption assumes that if the first and second inputs of the data transformation element 102 of the hardware design for the first data transformation pipeline match a set of first and second inputs recorded in the watched transaction data for the data transformation element for any cycle (i) (stored_add_a[i]==first_pipe_add_a) && (stored_add_b[i]==first_pipe_add_b) then the output of the data transformation element 102 of an instantiation of the hardware design for the first data transformation pipeline is equal to the output recorded in the watched transaction data for the data transformation element 102 in that cycle (i) (stored_add_y[i]==first_pipe_add_y)).

Testing has shown that performing the formal verification under such as constraint significantly increases the likelihood that the formal verification will converge. Once the formal verification is complete the method 900 ends.

As described above, in some cases prior to performing the formal verification of block 906 one or more of the substantially equivalent data transformation elements of the first and second data transformation pipelines may be black boxed to improve the likelihood that the formal verification will converge. Since in the method 900 of FIG. 9 the first and second data transformation pipelines are the same each of the data transformation elements in the first data transformation pipeline has an identical data transformation element in the second data transformation pipelines. Thus all of the data transformation elements of the first and second data transformations are "substantially equivalent" to a data transformation element in the other data transformation pipeline. This means that any data transformation element of the first or second data transformation pipelines may be black boxed so long as the output(s) of that data transformation element or the corresponding data transformation element in the first data transformation element are constrained during the formal verification as described above.

As described above, where a data transformation element of the first data transformation pipeline is black boxed the constraint on the outputs thereof causes the black box element to act in a deterministic manner during formal verification. As described above, the constraint may be implemented by one or more assumption statements. As is known to those of skill in the art, an assumption statement in a hardware design is interpreted by a formal verification tool as a constraint on the behaviour of an instantiation of the hardware design during formal verification. Specifically, when a property is assumed, formal verification tools constrain the inputs so that the property holds. Accordingly, assumptions define an environment in which a property of a hardware design is verified. Therefore, an assumption that states the outputs of a black box element act in a certain way in relation to the stored inputs effectively causes the black box element to act in a deterministic manner during formal verification with respect to the stored inputs. Specifically, an assumption may state that if the inputs to the black box element match a set of inputs recorded in the watched transaction data for the corresponding data transformation element, that the output of the black box element is the output recorded in the watched transaction data for the corresponding data transformation element for that set of inputs. This effectively causes the black box element to respond to the input data recorded in the watched transaction data in the manner set out in the watched transaction data.

Figure 10:
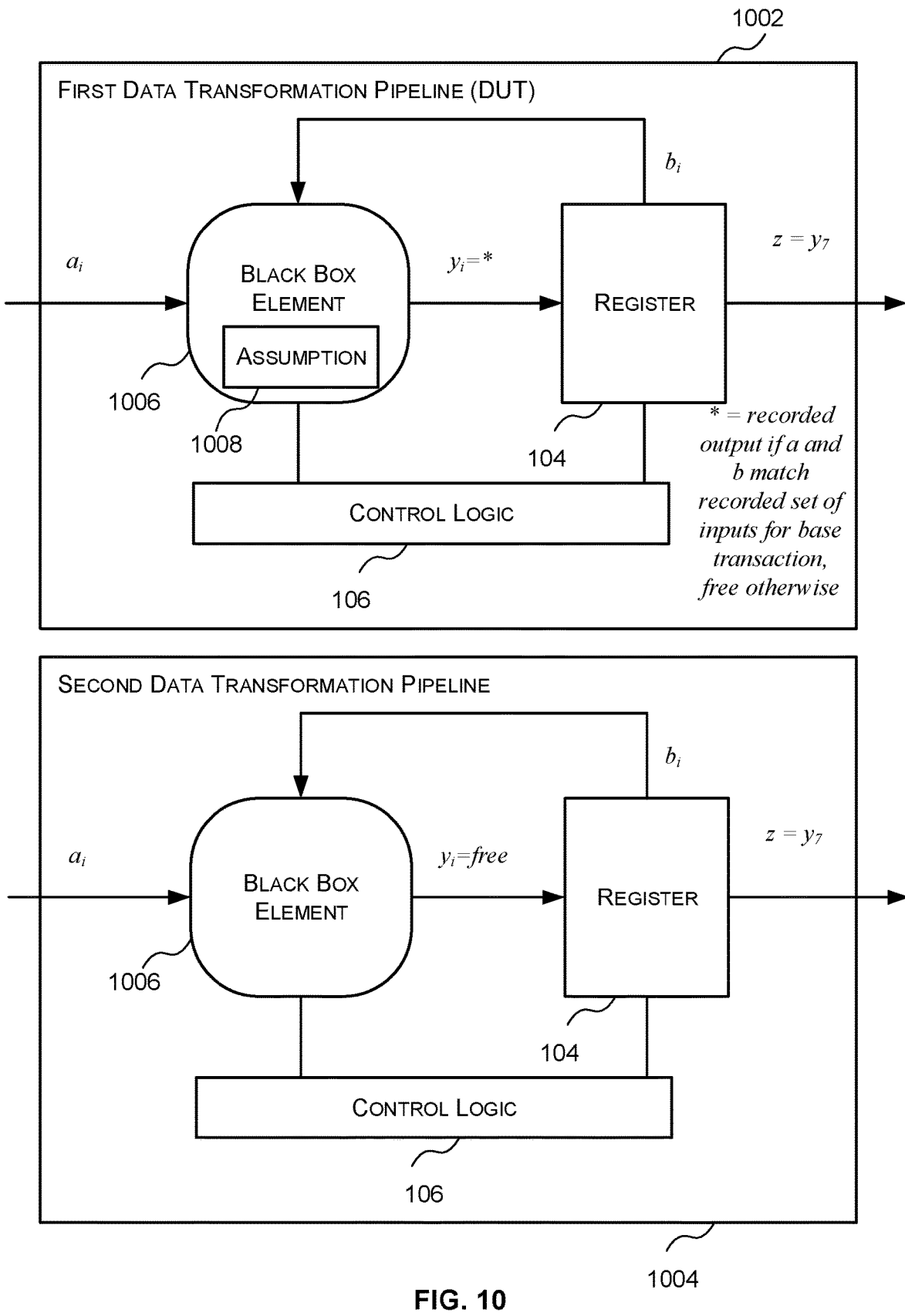
FIG. 10 is block diagram of a first example set of first and second data transformation pipelines wherein the data transformation elements have been replaced with black box elements.

For example, where the first and second data transformation pipelines 1002, 1004 are data transformation pipelines, such as that shown in FIG. 1, that comprise a single data transformation element 102 that receives two inputs and outputs the sum of the two inputs, the data transformation element 102 in the hardware design for each data transformation pipeline 1002, 1004 may be replaced with a black box element 1006 as shown in FIG. 10 that receives two inputs and generates a single output. By black boxing the data transformation element 102 the logic that performs the addition (a+b) is removed from the hardware designs.

As described above, in this example the hardware design for the second data transformation pipeline is linked to a capture module that is configured to capture the input and output signals ($a_i$, $b_i$, $y_i$) of the black box element 1006 of an instantiation of the hardware design for the second data transformation pipeline for eight consecutive cycles from a predetermined state (assuming there are no stalls or other events which extend the calculation). It is then formally verified that when an instantiation of the hardware design for the first data transformation pipeline 1002 receives the pipeline inputs recorded by the capture module in the same order that it produces the pipeline output recorded by the capture module.

The formal verification is performed under a constraint (e.g. assumption 1008) that if the inputs (a and b) to the black box element 1006 of an instantiation of the hardware design for the first data transformation pipeline 1002 match a set of inputs recorded by the capture module then the output (y) is equal to the output recorded by the capture module for that set of inputs. This effectively causes the black box element 1006 to act in accordance with the watched transaction data. For example, if the watched transaction data records inputs a=2 and b=7, and output y=26 for the black box element 1006 of an instantiation of the hardware design for the second data transformation pipeline 1004, then when the black box element 1006 of an instantiation of the hardware design for the first data transformation pipeline 1002 receives inputs a=2 and b=7 it will output y=26. So while the black box element 1006 of the second data transformation pipeline is treated as having a 'free' output during the formal verification, the black box element 1006 of the first data transformation pipeline is treated as having a deterministic output during the formal verification with respect to the stored inputs for that black box element.

Figure 11:
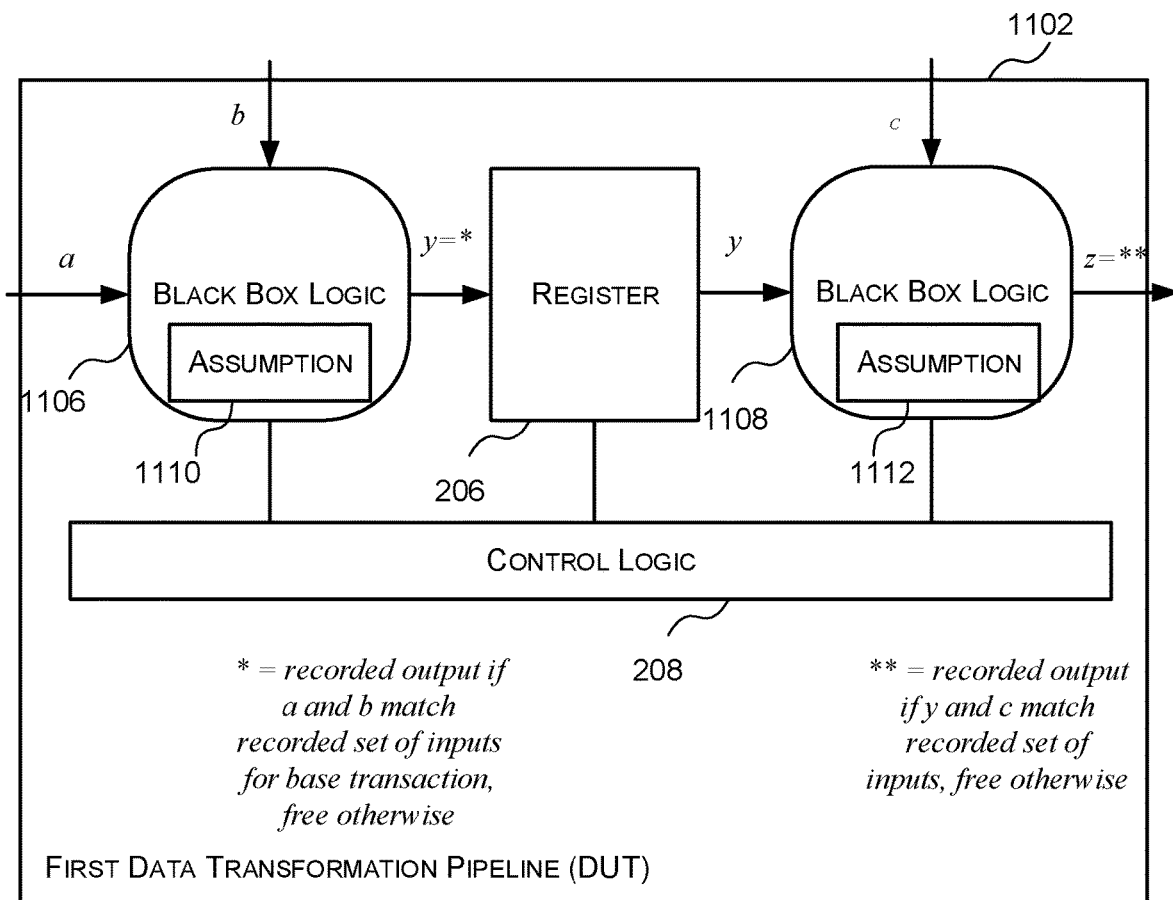
FIG. 11 is block diagram of a second example set of first and second data transformation pipelines wherein the data transformation elements have been replaced with black box elements.
Figure 11:
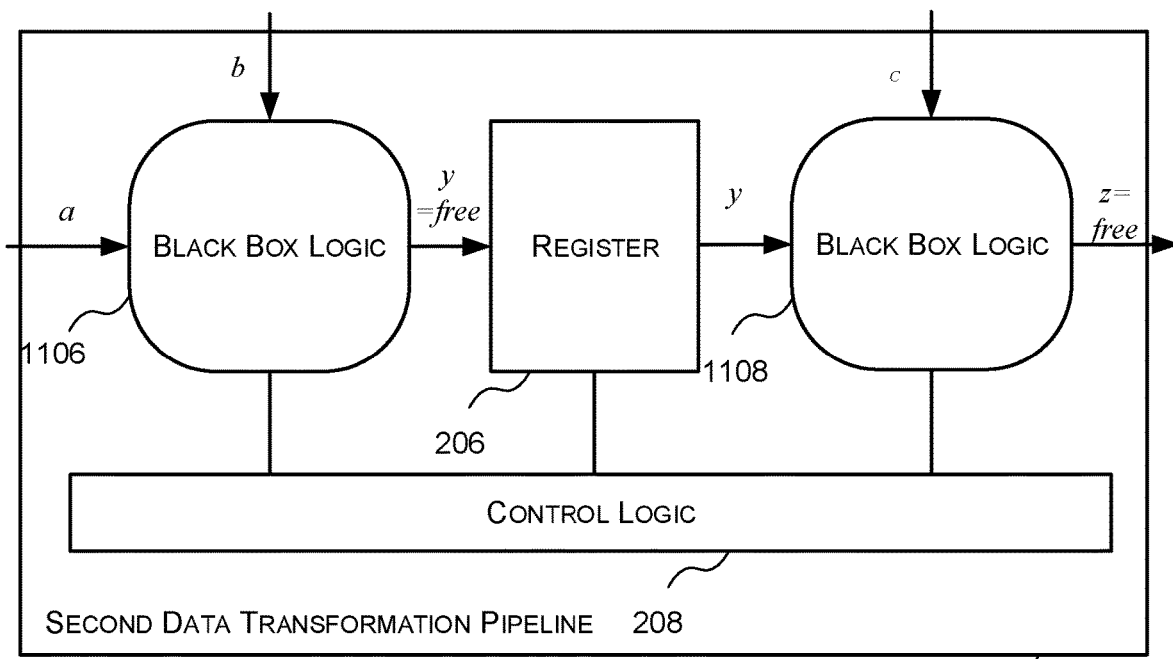

In another example, where the first and second data transformation pipelines 1102, 1104 are data transformation pipelines, such as the data transformation pipeline 200 of FIG. 2, that comprise a first data transformation element 202 that receives two inputs and outputs the sum of the two inputs, and a second data transformation element 204 that receives two inputs and outputs the product of the two inputs, each data transformation element 202, 204 in the hardware designs for the first and second data transformation pipeline may be replaced with corresponding black box elements 1106, 1108 as shown in FIG. 11. Specifically, each first data transformation element 202 may be replaced with a black box element 1106 that receives two inputs and has a 'free' output and the second data transformation element 204 is replaced with a block box element 1108 that receives two inputs and has a 'free' output. By black boxing the data transformation elements 202, 204 the logic that performs the addition (a+b) and multiplication (y*c) is removed from the hardware designs.

As described above, in this example the hardware design for the second data transformation pipeline is linked to a capture module that is configured to capture the input and output signals of the first black box element 1106 in the first cycle from a predetermined state of the pipeline and capture the input and output signals of the second black box element 1108 in a second cycle from the predetermined state of the pipeline. It is then formally verified that when an instantiation of the hardware design for the first data transformation pipeline 1102 receives the pipeline inputs recorded by the capture module in the same order that it produces the pipeline output recorded by the capture module.

The formal verification is performed under a first constraint (e.g. assumption 1110) that if the inputs (a and b) to the first black box element 1106 of an instantiation of the hardware design for the first data transformation pipeline 1102 match a set of inputs recorded in the watched transaction data for that element, then the output (y) is equal to the corresponding output recorded in the watched transaction data for that element; and a second constraint (e.g. assumption 1112) that if the inputs (y and c) to the second black box element 1108 of an instantiation of the hardware design for the first data transformation pipeline match a set of inputs recorded in the watched transaction data for that element then the output (z) is equal to the corresponding output recorded in the watched transaction data for that element. This causes each black box element 1106, 1108 in an instantiation of the hardware design for the first data transformation pipeline 1102 to produce a recorded output if it receives a recorded set of inputs, otherwise the output is 'free'. For example, if the watched transaction data recorded a set of inputs 4 and 6, and an output 8 for that data transformation element then when the corresponding black box element in an instantiation of the hardware design for the first data transformation pipeline receives inputs 4 and 6 it will output 8.

Although the method 900 of FIG. 9 is described as being implemented with two copies of the hardware design for the data transformation pipeline under test—i.e. the input/outputs of data transformation elements of an instantiation of a hardware design for the second data transformation pipeline (i.e. a second copy of the hardware design for the first data transformation pipeline) are recorded for a transaction executed from a predetermined state of the pipeline and compared to the inputs/outputs of an instantiation of a hardware design for the first data transformation pipeline (i.e. a first copy of the hardware design for the first data transformation pipeline) for transactions executed from any state of the pipeline—in other examples the method may be implemented with a single copy of the hardware design for the data transformation pipeline under test. In these cases, the hardware design may first be configured to execute a transaction from the predetermined state and the inputs/outputs of the relevant data transformation elements of an instantiation of the design are recorded by the capture module; the hardware design may then be reconfigured to execute transactions from any state and the inputs/outputs of the relevant data transformation elements of an instantiation of the hardware design are compared to the recorded inputs/outputs. In this manner when the hardware design is configured to execute a transaction from the predetermined state the hardware design acts as the hardware design for the second data transformation pipeline and when the hardware design is configured to execute transactions from any state the hardware design acts as the hardware design for the first data transformation pipeline as the terms first and second data transformation pipelines are used above.

Figure 12:
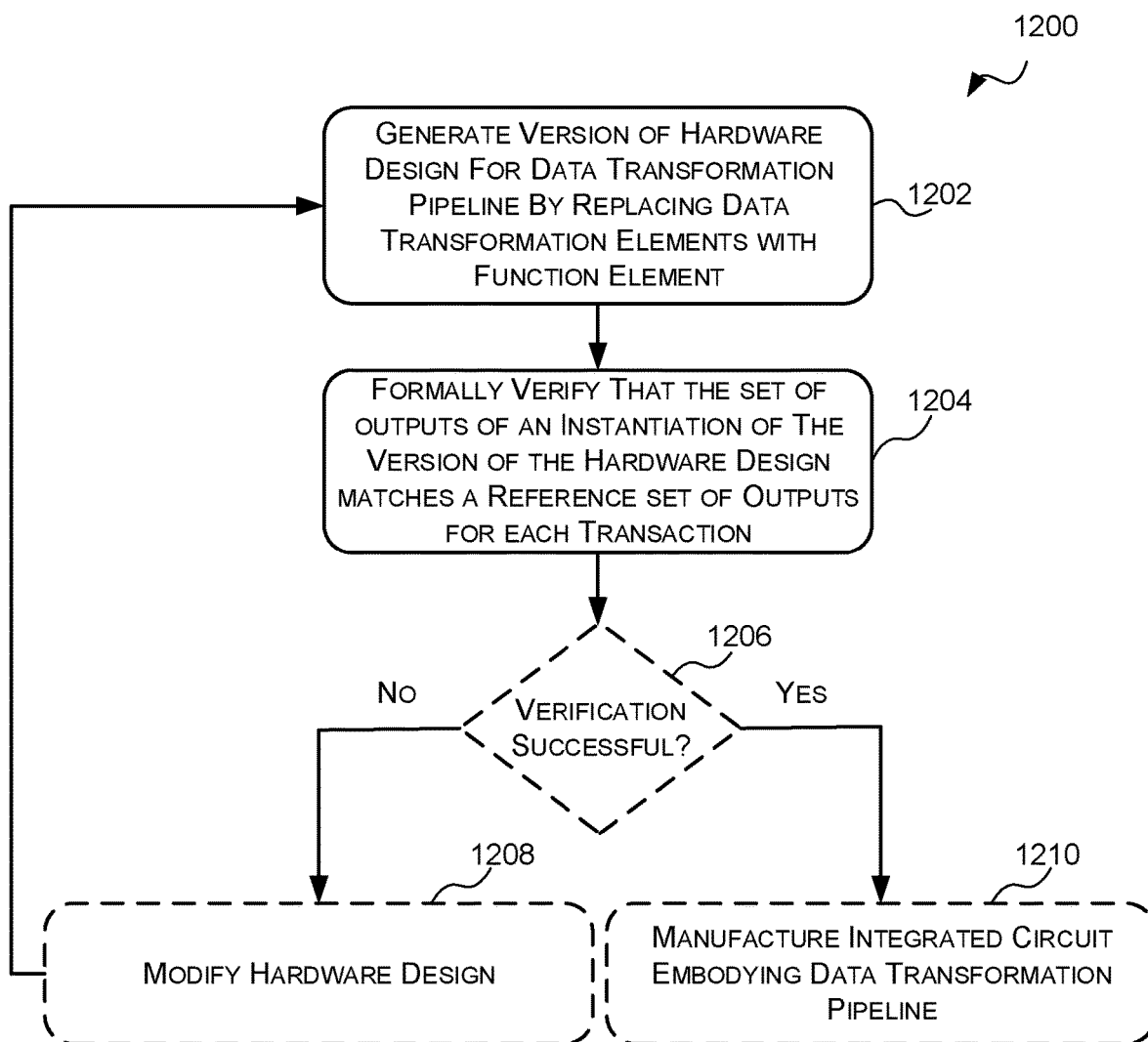
FIG. 12 is a flow diagram of a second example method for verifying a hardware design for a data transformation pipeline.
Figure 13:
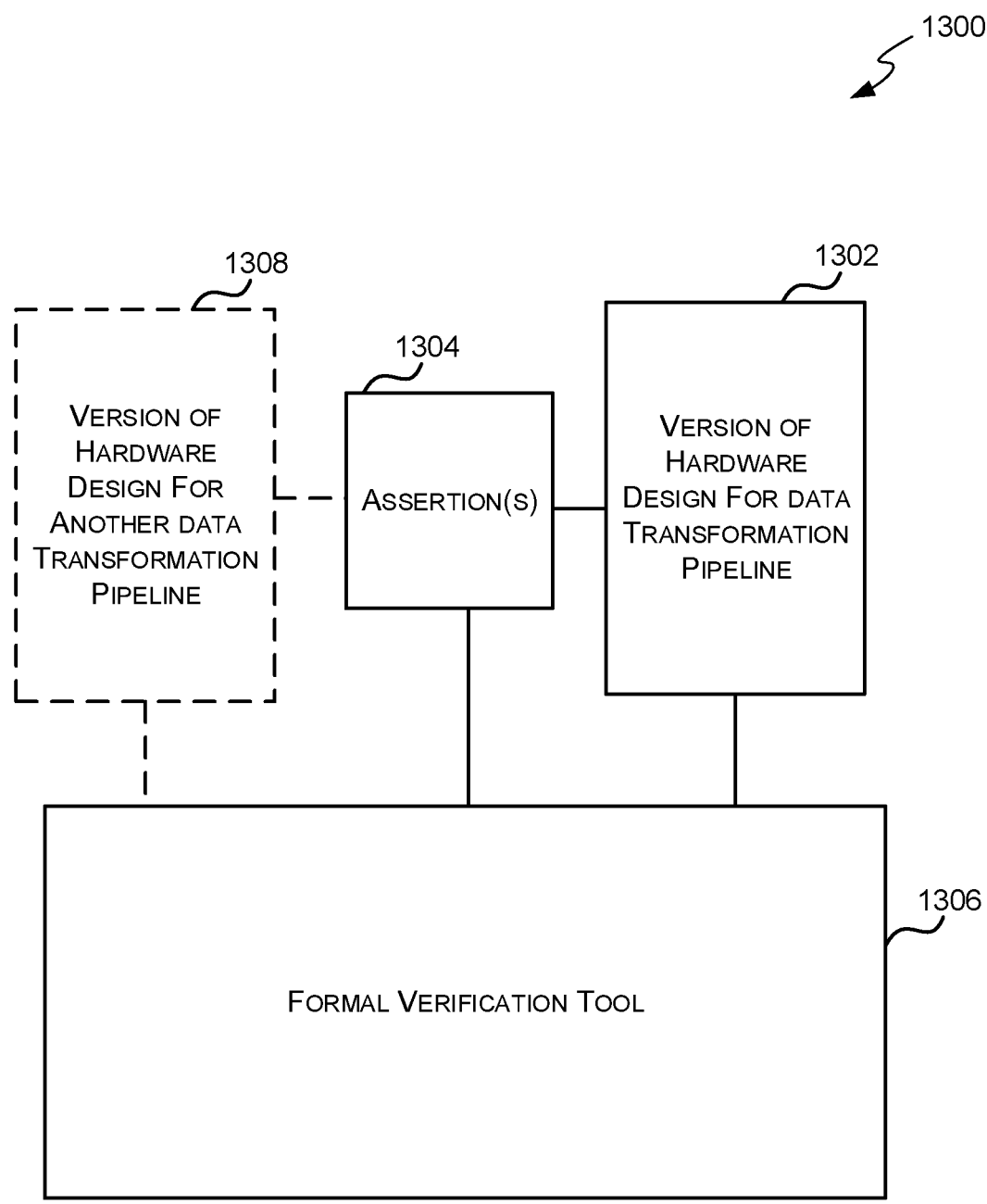
FIG. 13 is a block diagram of an example system for verifying a hardware design for a data transformation pipeline in accordance with the method of FIG. 12.

Reference is now made to FIGS. 12-13 which describe a second embodiment for verifying a hardware design for a data transformation pipeline. In this embodiment, a version of the hardware design for the data transformation pipeline is generated in which a selected set of data transformation elements are replaced with, or linked to, a function element which is treated as unevaluated function of its inputs by a formal verification tool such that during formal verification the function element will produce the same output(s) in response to the same input(s); and formally verifying that for each transaction of a set of transactions that an instantiation of the version of the hardware design for the data transformation pipeline produces a set of one or more outputs that match a reference set of one or more outputs for that transaction.

In some cases, verifying that for each transaction of a set of transactions an instantiation of the version of the hardware design for the data transformation pipeline produces a set of one or more outputs that match a reference set of one or more outputs for that transaction may comprise formally verifying that an instantiation of the version of the hardware design is consistent (i.e. that it will always produce the same result to a transaction regardless of when the transaction is executed). In these cases the reference set of one or more outputs for a transaction may be the set of one or more outputs generated by an instantiation of the version of the hardware design for the data transformation pipeline when the instantiation executes the transaction from a predetermined state of the pipeline.

In other cases, verifying that for each transaction of a set of transactions an instantiation of the version of the hardware design for the data transformation pipeline produces a set of one or more outputs that match a reference set of one or more outputs for that transaction may comprise formally verifying that an instantiation of the version of the hardware design is functionally equivalent to an instantiation of a hardware design for another data transformation pipeline. The other data transformation pipeline comprises at least one data transformation element that is substantially equivalent to a data transformation element of the data transformation pipeline under test. In these cases, the reference set of one or more outputs for a transaction may be the set of one or more outputs generated by an instantiation of a version of the hardware design for the other data transformation pipeline when the instantiation executes the transaction.

Reference is now made to FIG. 12 which illustrates a second example method 1200 for verifying a hardware design for a data transformation pipeline. The method 1200 begins at block 1202 where a version of the hardware design for the data transformation pipeline is generated in which a selected set of the data transformation elements (which may be all or a subset of the data transformation elements) of the pipeline are replaced with a function element which is treated as an unevaluated function of the inputs to the data transformation element. The unevaluated function F is a symbolic object such that $F(x)=F(x) \forall x$. This means that a formal verification tool will be able to verify that F(x)=F(x) but a formal verification tool cannot verify F(x)=anything else, this will fail.

The particular set of data transformation elements that are replaced with a function element may be based on whether the method is being used to verify that a hardware design for a data transformation pipeline is consistent, or whether the method is being used to verify that a hardware design for a data transformation pipeline is functionally equivalent to a hardware design for another data transformation pipeline. Where the method is being used to verify that a hardware design for a data transformation pipeline is consistent (i.e. that it will always produce the same result to a transaction regardless of when the transaction is executed) then any combination of the data transformation elements of the data transformation pipeline may be replaced with a function element. In contrast, where the method is being used to verify that a hardware design for a data transformation pipeline is functionally equivalent to a hardware design for another data transformation pipeline (i.e. that instantiations of the two hardware designs will produce the same results to the same inputs) and at least one data transformation of the other data transformation pipeline is substantially equivalent to a data transformation element of the data transformation pipeline under test, then any combination of the substantially equivalent data transformation elements may be replaced with a function element.

For example, to verify that the hardware design for the example data transformation pipeline 100 of FIG. 1 is consistent the version of the hardware design that is used in the formal verification may be generated by replacing the data transformation element 102 with a function element that is treated as an unevaluated function F(a, b)=y such that whenever the same set of a and b are received the output y will be the same, but no other properties of F are assumed. Similarly, to verify that the hardware design for the example data transformation pipeline 200 of FIG. 2 is consistent the version of the hardware design that is used in the formal verification may be generated by replacing either or both of the first data transformation element 202 and the second data transformation element 204 with a corresponding function element. For example, the first data transformation element 202 may be replaced with a function element that is treated as an unevaluated function F(a,b)=y such that whenever the same set of a and b are received the output y will be the same; and replacing the second data transformation element 204 with a function element that is treated as an unevaluated function G(y,c)=z such that whenever the same set of y and c are received the output z will be the same.

In contrast, to verify that the hardware design for the first example data transformation pipeline 502 of FIG. 5 is functionally equivalent to the hardware design for the second example data transformation pipeline 504 of FIG. 5 where there is only one pair of substantially equivalent data transformation elements (i.e. data transformation elements 506, 510) only the first data transformation element 506 in the hardware design for the first example data transformation element may be replaced with a function element that is treated as an unevaluated function of its inputs such that whenever the same set of input(s) are received the output(s) will be the same.

Replacing data transformation elements with function elements means that if the same set of inputs pass through the same function elements at any time the data transformation pipeline should produce the same result (assuming the control logic is working as expected).

Once the version of the hardware design for the data transformation pipeline has been generated the method 1200 proceeds to block 1204.

At block 1204 it is formally verified that for each transaction of a set of transactions an instantiation of the version of the hardware design for the data transformation pipeline generated in block 1202 produces a set of one or more outputs that match a reference set of one or more outputs. The set of transactions may comprise all the valid transactions that may be executed by the data transformation pipeline or only a subset of the valid transaction that may be executed by the data transformation pipeline.

In some cases, formally verifying that for each transaction of a set of transactions an instantiation of the version of the hardware design for the data transformation pipeline produces a set of one or more outputs that match a reference set of one or more outputs for that transaction may comprise formally verifying that an instantiation of the version of the hardware design for the data transformation pipeline is consistent (i.e. that an instantiation of the version of the hardware design for the data transformation pipeline will produce the same result (or output) for the same transaction regardless of when the transaction is executed (i.e. regardless of the state of the pipeline when the transaction is executed)). In these cases, the reference set of one or more outputs for a transaction may be the set of one or more outputs generated by an instantiation of the version of the hardware design for the data transformation pipeline when the instantiation executes the transaction from a predetermined state of the pipeline. As described above, a transaction is defined by the inputs to the transaction. Accordingly, an instantiation of the version of the hardware design for the data transformation pipeline is said to perform the same transaction if it processes the same set of inputs. For example, the inputs for a transaction for the example data transformation pipeline 100 of FIG. 1 are $a_0$, $a_1$, $a_2$, $a_3$, $a_4$, $a_5$, $a_6$ and $a_7$. In this example an instantiation of the version of the hardware design for the data transformation pipeline is said to execute the same transaction from two different states if it executes a transaction for $a_0$, $a_1$, $a_2$, $a_3$, $a_4$, $a_5$, $a_6$, $a_7$=3, 4, 2, 6, 8, 3, 9, 10 from one state of the pipeline (e.g. the state arising from reset) and executes a transaction for $a_0$, $a_1$, $a_2$, $a_3$, $a_4$, $a_5$, $a_6$, $a_7$=3, 4, 2, 6, 8, 3, 9, 10 from another state of the pipeline.

Formally verifying that an instantiation of the version of the hardware design for the data transformation pipeline is consistent may comprise comparing the output(s) of an instantiation of the version of the hardware design for the data transformation pipeline when the data transformation pipeline executes a transaction from a predetermined state, to the output(s) of an instantiation of the version of the hardware design for the data transformation pipeline when the data transformation pipeline executes a transaction from any state. This may be implemented using two copies of the version of the hardware design for the data transformation or a single copy of the version of the hardware design for the data transformation pipeline. For example, formally verifying that an instantiation of the version of the hardware design for the data transformation pipeline is consistent may comprise formally verifying that the output(s) of an instantiation of a first copy of the version of the hardware design configured to execute a transaction from a predetermined state match the output(s) of an instantiation of a second copy of the version of the hardware design configured to execute transactions from any state when the same transaction is executed by the two instantiations. Alternatively, formally verifying that an instantiation of the version of the hardware design for the data transformation pipeline is consistent may comprise first configuring the version hardware design for the data transformation pipeline to execute a transaction from a predetermined state and recording the output(s) of the instantiation of the version of the hardware design; and then configuring the version of the hardware design for the data transformation pipeline to execute transactions from any state and comparing the output(s) of an instantiation of the version of the hardware design to the recorded output(s).

In other cases, formally verifying that for each transaction of a set of transactions an instantiation of the version of the hardware design for the data transformation pipeline produces a set of one or more outputs that matches a reference set of one or more outputs for that transaction may comprise formally verifying that an instantiation of the version of the hardware design is functionally equivalent to an instantiation of a version of a hardware design for another data transformation pipeline. The other data transformation pipeline comprises at least one data transformation element that is substantially equivalent to a data transformation element of the data transformation pipeline under test. In these cases, the formal verification may compare the output(s) of the version of the hardware design for the data transformation pipeline against the output(s) of a version of the hardware design for the other data transformation pipeline in which one or more of the substantially equivalent data transformation elements in the other data transformation pipeline have been replaced with the function element which was used to replace the substantially equivalent data transformation element in the data transformation pipeline under test. Accordingly, in these cases the reference set of one or more outputs for a transaction may be the set of one or more outputs generated by an instantiation of the version of the hardware design for the other data transformation pipeline when the instantiation executes the transaction.

In either case, formally verifying that for each transaction of a plurality of transactions an instantiation of the version of the hardware design for the data transformation pipeline produces a set of one or more outputs that match a reference set of one or more outputs for that transaction may comprise generating one or more assertions, linking the one or more assertions to the version(s) of the hardware design(s) for the data transformation pipeline(s), formally verifying, using a formal verification tool, that the one or more assertions are true (or hold) for the version of the hardware design for the data transformation pipeline, and outputting one or more signals indicating whether the one or more assertions were successfully verified.

Once the formal verification is complete the method 1200 may end or the method 1200 may proceed to block 1206.

At block 1206, a determination may be made as to whether the verification of the version of the hardware design for the data transformation pipeline was successful. As described above, when a formal verification tool is used to verify an assertion for a hardware design, the formal verification tool may output a signal or a set of signals that indicates whether or not the assertion is valid (i.e. the asserted property is true for all valid states or sequence of states). In these cases, the determination as to whether the verification was successful may be based on the output signal(s) of the formal verification tool.

If it is determined that the verification of the version of the hardware design for the data transformation pipeline was successful indicating that an instantiation of the hardware design will produce, for any transaction, a set of one or more outputs that match a reference set of one or more outputs for that transaction (i.e. the instantiation is consistent or the instantiation is functionally equivalent to an instantiation of another design), the method 1200 may proceed to block 1210 where an integrated circuit embodying the data transformation pipeline described by the hardware design is manufactured. If, however, it is determined that the verification of the version of the hardware design for the data transformation pipeline was not successful, indicating that there is an error in the hardware design, then the method 1200 may proceed to block 1208 where the hardware design is modified to correct the error in the hardware design that caused the unexpected behaviour. Once the hardware design has been modified the modified hardware design may be re-verified (e.g. blocks 1202-1210 may be repeated for the modified hardware design).

The verification method 1200 of FIG. 12 is significantly simpler that the verification method 400 of FIG. 4 described above for verifying that a hardware design for a data transformation pipeline is consistent as it does not involve storing watched transaction data, nor does it involve controlling the output of data transformation elements or black box elements in accordance with the watched transaction data. However, the verification method 1200 of FIG. 12 will typically only be viable with formal verification tools that interpret such function elements in the manner described above. Specifically, the verification method 1200 of FIG. 12 will typically only be viable with formal verification tools that interpret such function elements as an unevaluated function of its inputs.

In some cases, constraints or restrictions may be placed on the output of one or more of the function elements to ensure that the function element will not generate unexpected outputs or outputs with unexpected properties (i.e. outputs which cannot not be validly generated by the corresponding data transformation element). Such restrictions may be imposed on the function element by, for example, adding an assumption to the version of the hardware design for the data transformation pipeline. For example, if a data transformation element is configured to generate the square of an input, the data transformation element cannot validly output a negative number. Accordingly the downstream components may expect for the data transformation element to output a number greater than or equal to zero. In this example, an assumption may be generated for the function element that replaces this data transformation element that states that the output of the function element is greater than or equal to zero. Similarly, if a data transformation element is configured to output the sine of the input then an assumption may be generated for the function element that replaces that data transformation element that the output of the function element is between −1 and 1 inclusive. It will be evident to a person of skill in the art that these are examples only and that other constraints or restrictions may be imposed on a function element.

Reference is now made to FIG. 13 which illustrates an example system 1300 for verifying a hardware design for a data transformation pipeline in accordance with the second embodiment in which it is verified that a version of the hardware design for the data transformation pipeline in which one or more data transformation elements of the pipeline are replaced with a function element, will generate for each transaction of a set of transactions, a set of one or more outputs that match a reference set of one or more outputs for that transaction.

The system 1300 comprises a version of the hardware design for the data transformation pipeline 1302 in which one or more data transformation elements have been replaced with a function element; one or more formal assertions 1304; and a formal verification tool 1306. Where the system 1300 is used to verify that two hardware designs for different data transformation pipelines are functionally equivalent, the system 1300 may also comprise a version of the hardware design for the other data transformation pipeline in which one or more data transformation elements have been replaced with a function element. In general, the formal verification tool 1306 is configured to formally verify the one or more assertions 1304 are true for the version of the hardware design for the data transformation pipeline 1302 to verify that an instantiation of the data transformation pipeline will generate, for any transaction, a set of one or more outputs that matches a reference set of one or more outputs for that transaction.

The version of the hardware design for the data transformation pipeline 1302 is a version of the hardware design for the data transformation pipeline in which the description of the structure and/or function of each of a selected set of data transformation elements of the data transformation pipeline has been replaced with a description of the structure and/or function of a function element which is treated as an unevaluated function of its inputs by a formal verification tool. In other words, the version of the hardware design for the data transformation pipeline describes the data transformation pipeline of the initial hardware design except each of a selected set of data transformation elements has been replaced with a corresponding function element.

Similarly, where there is a version of a hardware design for the other data transformation pipeline this version of the hardware design for the other data transformation pipeline is a version of the hardware design for the other data transformation pipeline in which the description of the structure and/or function of each of a selected set of data transformation elements of the data transformation pipeline has been replaced with a description of the structure and/or function of a function element which is treated as an unevaluated function of its inputs by a formal verification tool. In these cases, the selected set of data transformation elements that are replaced with function elements are the substantially equivalent data transformation elements (i.e. the data transformation elements that have a substantially equivalent data transformation element in the other data transformation pipeline) and each pair of substantially equivalent data transformation elements are replaced with the same function element.

The assertions 1304 comprise one or more formal assertions which if verified to be true for the version of the hardware design for the data transformation pipeline establishes that an instantiation of the hardware design for the data transformation produces, for any transaction, a set of one or more outputs that match a reference set of one or more outputs for that transaction. As described above, an assertion is a statement that a particular property is expected to hold for the hardware design (i.e. is always true).

Where an instantiation of the version of the hardware design for the data transformation pipeline produces, for any transaction, a set of one or more outputs that match a reference set of one or more outputs for that transaction if the instantiation of the version hardware design for the data transformation pipeline will produce the same outputs for transformations performed on the same inputs regardless of when the transformation is performed (i.e. regardless of the state of the pipeline from which the transformation is performed), the one or more assertions 1304 may assert that if an instantiation of the version of the hardware design for the data transformation pipeline executes a transaction it has seen before that the output is the same.

Where an instantiation of the version of hardware design for a data transformation pipeline produces, for any transaction, a set of one or more outputs that match a reference set of one or more outputs if the instantiation of the version hardware design for the data transformation pipeline is functionally equivalent to an instantiation of a hardware design for another data transformation pipeline, the one or more assertions 1304 may assert that the output of instantiations of the versions of the two hardware designs are always the same.

The one or more assertions 1304 are linked to the version(s) of the hardware design(s) for the data transformation pipeline(s) 1302, 1308 so that the one or more assertions are connected to the relevant signals of the version(s) of the hardware design(s) for the data transformation pipeline(s) to be able to evaluate the asserted property. As described above, the one or more assertions may be linked to the version(s) of the hardware design(s) by incorporating the one or more assertions into the version of the hardware design for the data transformation pipeline, or by binding the one or more assertions 1304 to the version(s) of the hardware design(s) for the data transformation pipeline(s).

The formal verification tool 1306 is a software tool that is capable of performing formal verification of a hardware design. Since the formal verification ideally verifies the assertion over infinite time it may be advantageous to use an infinite time formal verification tool.

The version(s) of the hardware design(s) for the data transformation pipeline(s) 1302, 1308; the one or more assertions 1304; and the bindings (if any) are loaded in the formal verification tool 1306. The formal verification tool 1306 is then configured to formally verify the one or more assertions 1304 are true for the version of the hardware design for the data transformation pipeline.

As described above, the formal verification tool 1306 may output information indicating whether the assertions were successfully verified and/or if one or more of the assertions were not successfully verified information indicating a state or sequence of states of the hardware design which causes the assertion to fail.

Although the method 1200 and system 1300 of FIGS. 12 and 13 were described as comprising generating a version of the hardware design for the data transformation in which at least one data transformation element is replaced with a function element and then formally verifying, for each transaction of a set of transactions, that the set of outputs of an instantiation of the version of the hardware design matches a reference set of outputs for that transaction, in other examples, instead of replacing data transformation elements with a function element, the version of the hardware design may be generated by linking the data transformation element to the function element such that during the formal verification the function element provides a hint as to the output of the data transformation element. In this way the function element acts in the same manner as the constraints of the methods and systems of FIGS. 4 to 11. Specifically, a formal verification tool may use the function element abstraction to simplify a formal verification by avoiding using the full complexity of the data transformation element, wherever the property being verified does not depend on the details of the data transformation, but only on the fact that it will always give the same output in response to the same inputs. For other properties which do depend on the specifics of the data transformation, this abstraction may not help with the verification, but other properties of the data transformation (e.g. squaring only produces positive outputs) may be imposed on the function element (e.g. as one or more assumptions) to improve convergence. In some cases, the full details of the data transformation may be needed for the verification, and the function element abstraction will provide no assistance, but this will be very rare.

In yet other examples, the two uses of function elements may be combined to verify a hardware design for a data transformation pipeline. In particular, in some examples one or more data transformation elements may be linked to a function element so that the function element provides a hint as to the output of the data transformation element during formal verification; and one or more other data transformation elements may be replaced with a function element.

Furthermore, although the methods and systems of FIGS. 4 to 11 and the methods and systems of FIGS. 12 and 13 were described above as being separate and distinct, in other examples a combination of the two methods may be used to verify the hardware design for a data transformation pipeline. In particular, in other examples a hardware design for a first data transformation pipeline may verified by formally verifying that a set of one or more outputs of an instantiation of the hardware design for the first data transformation pipeline matches a set of one or more outputs of an instantiation of a hardware design for a second data transformation pipeline for a predetermined set of transactions, wherein (i) the formal verification is performed under a constraint that a pair of substantially equivalent data transformation elements of the first and second data transformation pipelines produce the same outputs in response to the same inputs; and (ii) another pair of substantially equivalent data transformation elements of the first and second data transformation pipelines may be replaced with, or linked to, a function element prior to formal verification. In these examples, one or more of the constrained pairs of substantially equivalent data transformation elements may be replaced with a black box element prior to the formal verification as described above.

Figure 14:
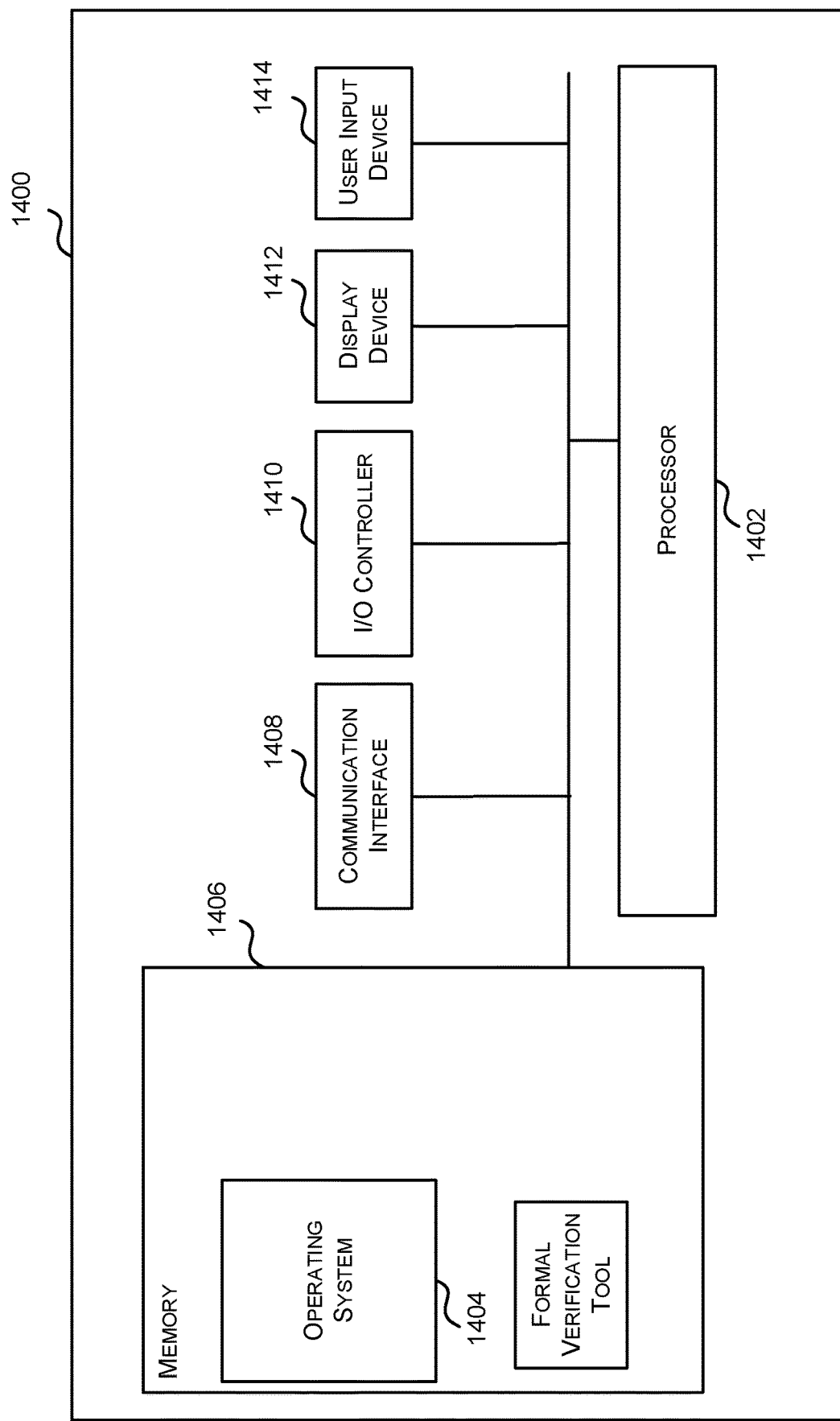
FIG. 14 is a block diagram of an example computing-based device.

FIG. 14 illustrates various components of an exemplary computing-based device 1400 which may be implemented as any form of a computing and/or electronic device, and in which embodiments of the methods and systems described herein may be implemented.

Computing-based device 1400 comprises one or more processors 1402 which may be microprocessors, controllers or any other suitable type of processors for processing computer executable instructions to control the operation of the device in order to verify a hardware design for a data transformation pipeline. In some examples, for example where a system on a chip architecture is used, the processors 1402 may include one or more fixed function blocks (also referred to as accelerators) which implement a part of the method of verifying a hardware design for a data transformation pipeline, in hardware (rather than software or firmware). Platform software comprising an operating system 1404 or any other suitable platform software may be provided at the computing-based device to enable application software, such as a formal verification tool, to be executed on the device.

The computer executable instructions may be provided using any computer-readable media that is accessible by computing-based device 1400. Computer-readable media may include, for example, computer storage media such as memory 1406 and communications media. Computer storage media (i.e. non-transitory machine-readable media), such as memory 1406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine-readable media, e.g. memory 1406) is shown within the computing-based device 1400 it will be appreciated that the storage may be distributed or located remotely and accessed via a network or other communication link (e.g. using communication interface 1408).

The computing-based device 1400 also comprises an input/output controller 1410 arranged to output display information to a display device 1412 which may be separate from or integral to the computing-based device 1400. The display information may provide a graphical user interface. The input/output controller 1410 is also arranged to receive and process input from one or more devices, such as a user input device 1414 (e.g. a mouse or a keyboard). This user input may be used to initiate verification. In an embodiment the display device 1412 may also act as the user input device 1414 if it is a touch sensitive display device. The input/output controller 1410 may also output data to devices other than the display device, e.g. a locally connected printing device (not shown in FIG. 14).

Figure 3:
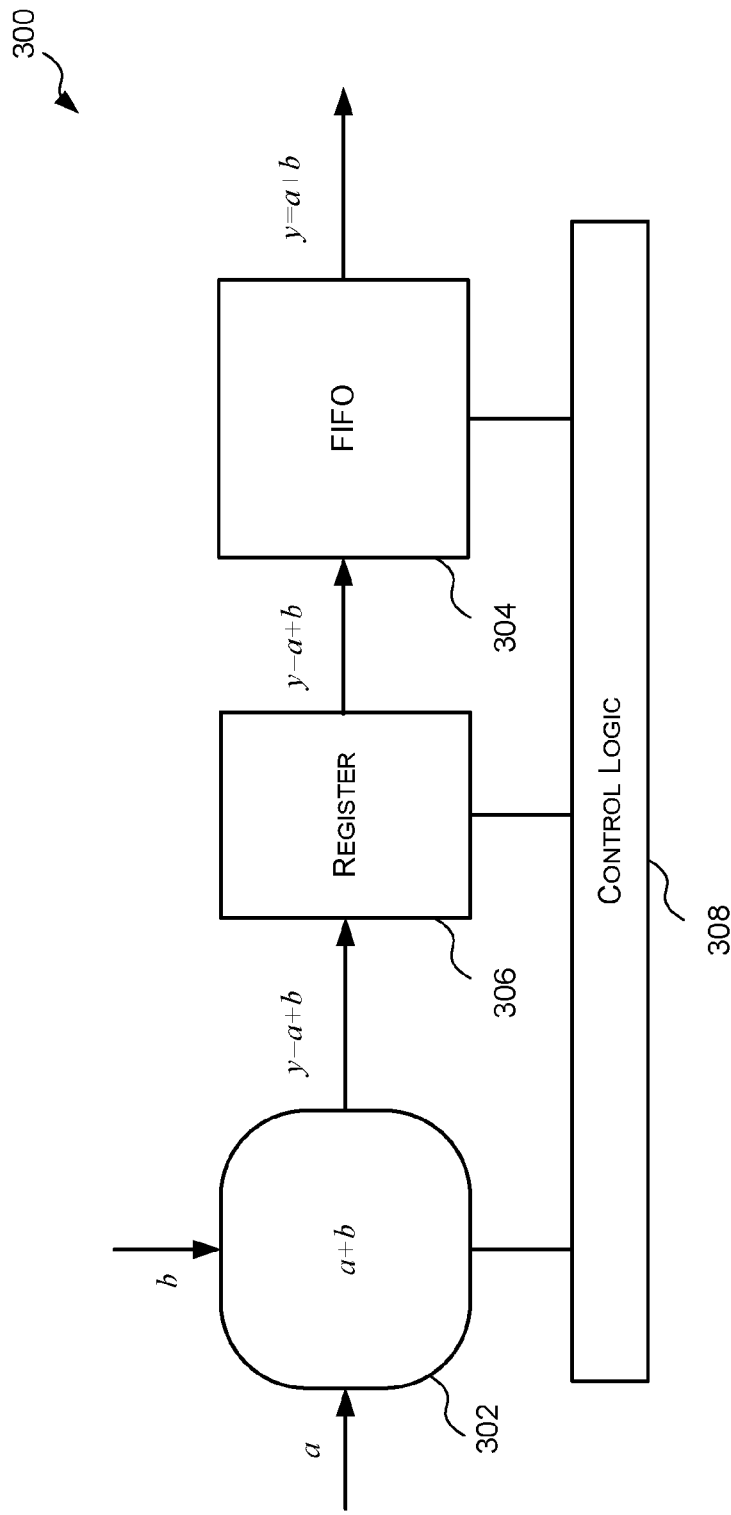
FIG. 3 is a block diagram of a third example data transformation pipeline.
Figure 15:
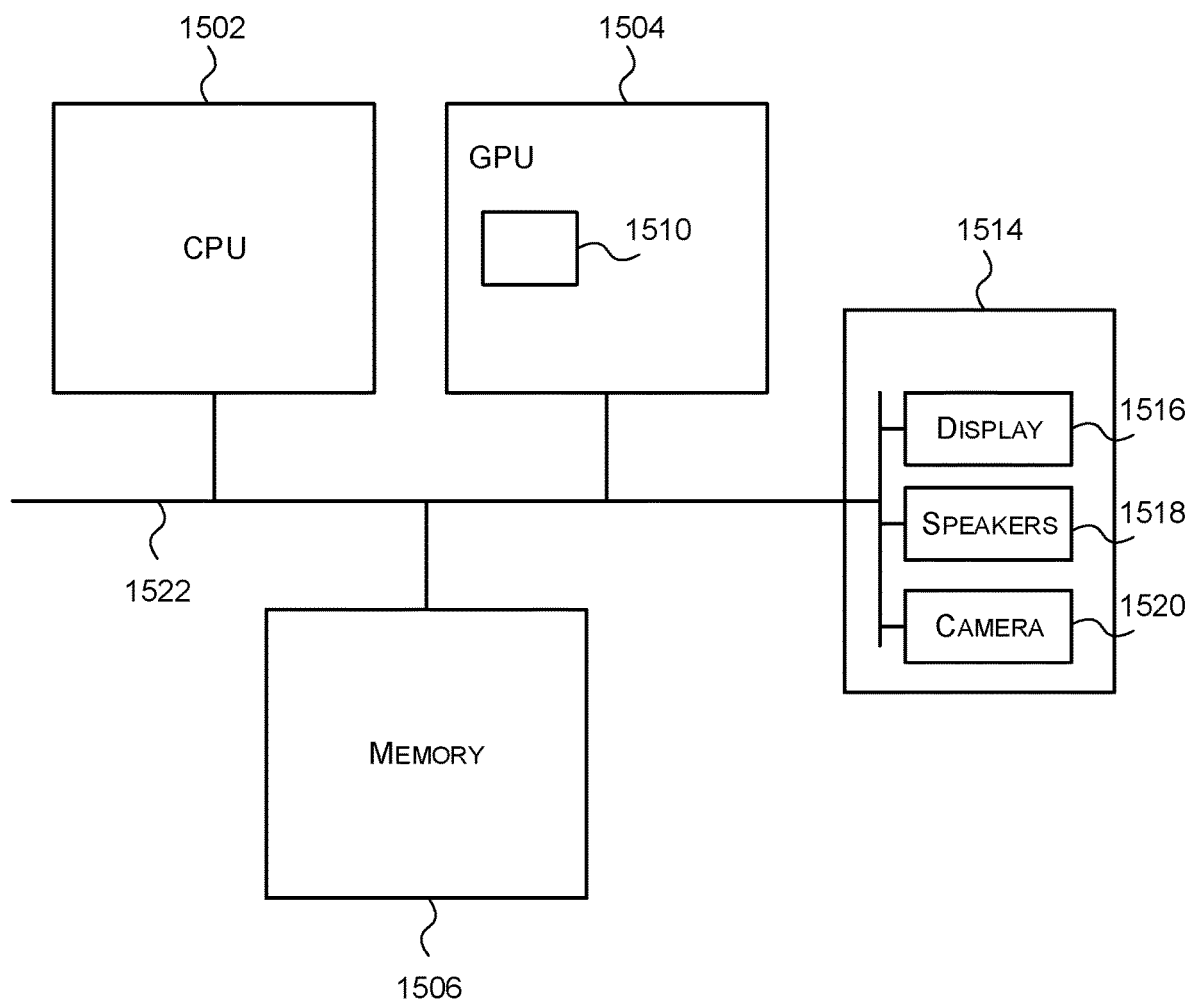
FIG. 15 is a block diagram of an example computer system in which a data transformation pipeline may be implemented.

FIG. 15 shows a computer system in which any of the data transformation pipelines described herein may be implemented. The computer system comprises a CPU 1502, a GPU 1504, a memory 1506 and other devices 1514, such as a display 1516, speakers 1518 and a camera 1520. A data transformation pipeline 1510 (such as, but not limited to, any of the data transformation pipelines 100, 200 or 300 described above with respect to FIGS. 1-3) is implemented on the GPU 1504. In other examples, the data transformation pipeline 1510 may be implemented on the CPU 1502. The components of the computer system can communicate with each other via a communications bus 1522.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (e.g. hardware design) that when processed (i.e. run) in an integrated circuit manufacturing system configures the system to manufacture a device (e.g. processor or other computing-based device) comprising any apparatus (e.g. data transformation pipeline) described herein. An integrated circuit definition dataset may be, for example, an integrated circuit description.

Therefore, there may be provided a method of manufacturing, at an integrated circuit manufacturing system, a data transformation pipeline as described herein. Furthermore, there may be provided an integrated circuit definition dataset (e.g. hardware design) that, when processed in an integrated circuit manufacturing system, causes the method of manufacturing a data transformation pipeline to be performed.

An integrated circuit definition dataset (e.g. hardware design) may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. hardware design) at an integrated circuit manufacturing system so as to configure the system to manufacture a data transformation pipeline will now be described with respect to FIG. 15.

Figure 16:
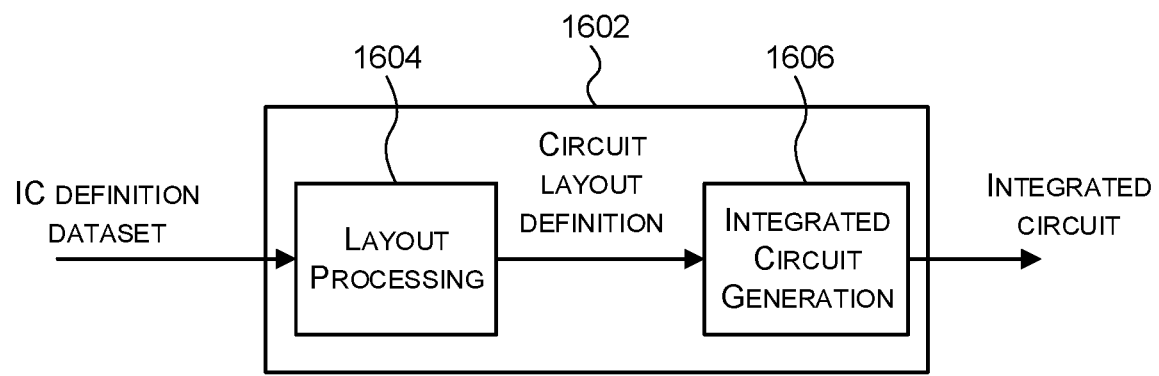
FIG. 16 is a block diagram of an example integrated circuit manufacturing system which may be used to generate an integrated circuit embodying a data transformation pipeline.

FIG. 16 shows an example of an integrated circuit (IC) manufacturing system 1602 which is configured to manufacture a data transformation pipeline as described in any of the examples herein. In particular, the IC manufacturing system 1602 comprises a layout processing system 1604 and an integrated circuit generation system 1606. The IC manufacturing system 1602 is configured to receive an IC definition dataset, such as a hardware design, (e.g. defining a data transformation pipeline as described in any of the examples herein), process the IC definition dataset, and generate an IC according to the IC definition dataset (e.g. which embodies a data transformation pipeline as described in any of the examples herein). The processing of the IC definition dataset configures the IC manufacturing system 1602 to manufacture an integrated circuit embodying a data transformation pipeline as described in any of the examples herein.

The layout processing system 1604 is configured to receive and process the IC definition dataset (e.g. hardware design) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1604 has determined the circuit layout it may output a circuit layout definition to the IC generation system 1606. A circuit layout definition may be, for example, a circuit layout description.

The IC generation system 1606 generates an IC according to the circuit layout definition, as is known in the art. For example, the IC generation system 1606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1606 may be in the form of computer-readable code which the IC generation system 1606 can use to form a suitable mask for use in generating an IC.

The different processes performed by the IC manufacturing system 1602 may be implemented all in one location, e.g. by one party. Alternatively, the IC manufacturing system 1602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture data transformation pipeline without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 16 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 16, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of verifying a hardware design for a data transformation pipeline, the data transformation pipeline comprising one or more data transformation elements that perform a data transformation on one or more inputs, the method comprising at one or more processors:

generating a version of the hardware design for the data transformation pipeline in which a data transformation element of the one or more data transformation elements has been replaced with, or linked to, a function element, the function element being treated as an unevaluated function of the one or more inputs to the data transformation element which has been replaced with, or linked to, the function element by a formal verification tool such that during formal verification the function element produces a same set of one or more outputs whenever a same set of one or more inputs are received; and formally verifying that for each transaction of a set of transactions, an instantiation of the version of the hardware design for the data transformation pipeline produces a set of one or more outputs that matches a reference set of one or more outputs for that transaction.

2. The method of claim 1, wherein formally verifying that for each transaction of the set of transactions the instantiation of the version of the hardware design for the data transformation pipeline produces a set of one or more outputs that matches a reference set of one or more outputs for that transaction comprises formally verifying that the instantiation of the version of the hardware design for the data transformation pipeline produces a same set of one or more outputs for a same transaction regardless of a state of the data transformation pipeline from which the transaction is performed.

3. The method of claim 1, wherein the reference set of one or more outputs for a transaction is a set of one more outputs produced by an instantiation of the version of the hardware design for the data transformation pipeline when the instantiation of the version of the hardware design for the data transformation pipeline executes that transaction from a predetermined state of the pipeline.

4. The method of claim 3, further comprising formally verifying that an instantiation of the hardware design for the data transformation pipeline produces a correct output to any transaction executed from a predetermined state of the pipeline.

5. The method of claim 1, wherein formally verifying that for each transaction of the set of transactions the instantiation of the version of the hardware design for the data transformation pipeline produces a set of one or more outputs that matches a reference set of one or more outputs for that transaction comprises formally verifying that the instantiation of the version of the hardware design for the data transformation pipelines produces a same set of one or more outputs as an instantiation of a version of a hardware design for another data transformation pipeline in response to a same set of one or more inputs.

6. The method of claim 1, wherein the reference set of one or more outputs for a transaction is a set of one more outputs produced by an instantiation of a version of a hardware design for another data transformation pipeline when the instantiation of the version of the hardware design for the other data transformation pipeline executes that transaction.

7. The method of claim 6, wherein the other data transformation pipeline comprises one or more data transformation elements that perform a data transformation on one or more inputs and the data transformation element of the data transformation pipeline that is replaced with, or linked to, the function element is substantially equivalent to a data transformation element of the other data transformation pipeline.

8. The method of claim 7, further comprising generating the version of the hardware design for the other data transformation pipeline from the hardware design for the other data transformation pipeline by replacing, or linking, the substantially equivalent data transformation element of the other data transformation pipeline with the function element.

9. The method of claim 1, wherein the version of the hardware design for the data transformation pipeline is generated by replacing, or linking, each of the one or more data transformation elements of the data transformation pipeline with a function element.

10. The method of claim 1, wherein formally verifying that for each transaction of the set of transactions the instantiation of the version of the hardware design for the data transformation pipeline produces a set of one or more outputs that matches a reference set of one or more outputs for that transaction comprises formally verifying one or more assertions are true for the hardware design for the data transformation pipeline.

11. The method of claim 1, wherein the formal verification is performed under a constraint that the function element does not generate outputs that cannot be generated validly by the data transformation element.

12. The method of claim 1, wherein the version of the hardware design for the data transformation pipeline is generated by replacing the data transformation element with the function element.

13. The method of claim 1, wherein the version of the hardware design for the data transformation element is generated by linking the data transformation element to the function element such that the function element provides a hint as to the output of the data transformation element during formal verification.

14. The method of claim 1, further comprising outputting one or more signals indicating whether the formal verification was successful.

15. The method of claim 1, further comprising, in response to determining that the formal verification was not successful, modifying the hardware design for the data transformation pipeline to generate a modified hardware design for the data transformation pipeline.

16. The method of claim 15, further comprising generating a version of the modified hardware design for the data transformation pipeline in which the data transformation element is replaced with, or linked to, the function element, and repeating the formal verification for the version of the modified hardware design for the data transformation pipeline.

17. The method of claim 1, further comprising, in response to determining that the formal verification was successful, manufacturing, using an integrated circuit manufacturing system, an integrated circuit embodying the data transformation pipeline according to the hardware design.

18. The method of claim 1, wherein, when processed in an integrated circuit manufacturing system, the hardware design for the data transformation pipeline configures the integrated circuit manufacturing system to manufacture an integrated circuit embodying the data transformation pipeline.

19. A non-transitory computer readable storage medium having stored thereon computer readable instructions that, when executed at a computer system, cause the computer system to perform the method as set forth in claim 1.

20. A system for verifying a hardware design for a data transformation pipeline, the data transformation pipeline comprising one or more data transformation elements that perform a data transformation on one or more inputs, the system comprising:
    memory configured to store:
        a version of the hardware design for the data transformation pipeline in which a data transformation element of the one or more data transformation elements has been replaced with, or linked to, a function element, the function element being treated as an unevaluated function of the one or more inputs to the data transformation element which has been replaced with, or linked to, the function element by a formal verification tool such that during formal verification the function element produces a same set of one or more outputs whenever a same set of one or more inputs are received; and
        a formal verification tool; and
    one or more processors configured to:
        formally verify, using the formal verification tool, that for each transaction of a set of transactions, an instantiation of the version of the hardware design for the data transformation pipeline produces a set of one or more outputs that matches a reference set of one or more outputs for that transaction.

* * * * *